United States Patent
Seon et al.

(10) Patent No.: US 11,310,720 B2
(45) Date of Patent: Apr. 19, 2022

(54) WIRELESS BATTERY MANAGEMENT SYSTEM, NODE FOR WIRELESS COMMUNICATION, AND NETWORK ESTABLISHMENT METHOD

(71) Applicant: SILICON WORKS CO., LTD., Daejeon (KR)

(72) Inventors: Yong Ju Seon, Daejeon (KR); Ki Suk Cho, Daejeon (KR); Kyu Ho Kim, Daejeon (KR); Ju Pyo Hong, Daejeon (KR); Young Ho Seo, Daejeon (KR)

(73) Assignee: SILICON WORKS CO., LTD., Daejeon (KR)

(*) Notice: Subject to any disclaimer, the term of this patent is extended or adjusted under 35 U.S.C. 154(b) by 0 days.

(21) Appl. No.: 17/005,838

(22) Filed: Aug. 28, 2020

(65) Prior Publication Data

US 2021/0068033 A1 Mar. 4, 2021

(30) Foreign Application Priority Data

Aug. 30, 2019 (KR) .................. 10-2019-0106983
Aug. 3, 2020 (KR) .................. 10-2020-0096538

(51) Int. Cl.
*H04W 40/32* (2009.01)
*H04W 4/80* (2018.01)
(Continued)

(52) U.S. Cl.
CPC ......... *H04W 40/32* (2013.01); *H02J 7/00032* (2020.01); *H02J 7/0047* (2013.01);
(Continued)

(58) Field of Classification Search
CPC ....... H04W 40/32; H04W 4/80; H04W 28/04; H04W 40/248; H04W 72/044; H04W 84/18; H02J 7/00032; H02J 7/0047
See application file for complete search history.

(56) References Cited

U.S. PATENT DOCUMENTS 6,671,730 B1 * 12/2003 Akatsu .................. H04L 67/303
709/223
8,254,348 B2 * 8/2012 Wright .................. H04W 4/029
370/338
(Continued)

FOREIGN PATENT DOCUMENTS

KR 10-1892385 B1 8/2018

*Primary Examiner* — Dominic E Rego
(74) *Attorney, Agent, or Firm* — Harness, Dickey & Pierce, P.L.C.

(57) ABSTRACT

A wireless battery management system for quickly establishing a short-range wireless network. The wireless battery management system includes a manager node storing network configuration information when operating in a first mode, and when operating in a second mode, checking one or more monitor nodes being joined in a short-range wireless network using the network configuration information to establish the short-range wireless network along with each of the checked one or more monitor nodes and one or more monitor nodes storing joining information for joining in the short-range wireless network when operating in the first mode, and when operating in the second mode, joining in the short-range wireless network on the basis of the joining information to transmit battery data to the manager node.

18 Claims, 14 Drawing Sheets

(51) Int. Cl.
*H04W 84/18* (2009.01)
*H02J 7/00* (2006.01)
*H04W 72/04* (2009.01)
*H04W 40/24* (2009.01)
*H04W 28/04* (2009.01)

(52) U.S. Cl.
CPC ............ *H04W 4/80* (2018.02); *H04W 28/04* (2013.01); *H04W 40/248* (2013.01); *H04W 72/044* (2013.01); *H04W 84/18* (2013.01)

(56) References Cited

U.S. PATENT DOCUMENTS

| | | | |
|---|---|---|---|
| 10,148,494 B2 | 12/2018 | Wei | |
| 10,743,318 B2* | 8/2020 | Nilsson | H04W 72/046 |
| 2003/0124979 A1* | 7/2003 | Tanada | H04W 84/20 |
| | | | 455/41.1 |
| 2003/0169019 A1* | 9/2003 | Oosaki | H02J 7/0047 |
| | | | 320/132 |
| 2005/0125697 A1* | 6/2005 | Tahara | H04L 63/0227 |
| | | | 726/4 |
| 2006/0224709 A1* | 10/2006 | Johnson | H04L 67/289 |
| | | | 709/223 |
| 2007/0108946 A1* | 5/2007 | Yamauchi | H01M 10/4207 |
| | | | 320/132 |
| 2010/0238984 A1* | 9/2010 | Sayana | H04L 25/03343 |
| | | | 375/219 |
| 2012/0106544 A1* | 5/2012 | Yousefi | H04W 4/44 |
| | | | 370/355 |
| 2013/0005387 A1* | 1/2013 | Aso | H04W 4/70 |
| | | | 455/517 |
| 2013/0024678 A1* | 1/2013 | Yu | G06F 8/51 |
| | | | 713/1 |
| 2014/0087686 A1* | 3/2014 | Lee | H04W 4/90 |
| | | | 455/404.2 |
| 2015/0256426 A1* | 9/2015 | Venable, Sr. | H04L 63/10 |
| | | | 709/224 |
| 2016/0057161 A1* | 2/2016 | Li | H04L 63/0236 |
| | | | 726/1 |
| 2017/0115371 A1* | 4/2017 | Eaton | H01Q 1/34 |
| 2017/0212746 A1* | 7/2017 | Quin | H04L 67/12 |
| 2017/0230783 A1* | 8/2017 | Toya | H02J 7/00 |
| 2017/0280275 A1* | 9/2017 | Nagao | H04W 4/80 |
| 2017/0288433 A1* | 10/2017 | Maruyama | H02J 7/007 |
| 2019/0007074 A1* | 1/2019 | Shen | H04B 7/04 |
| 2019/0386835 A1* | 12/2019 | Tsuchitoi | H04L 9/085 |
| 2020/0053530 A1* | 2/2020 | Hwang | H04W 4/025 |
| 2020/0193363 A1* | 6/2020 | Jones | G06Q 10/20 |

* cited by examiner

WIRELESS BATTERY MANAGEMENT SYSTEM, NODE FOR WIRELESS COMMUNICATION, AND NETWORK ESTABLISHMENT METHOD

CROSS-REFERENCE TO RELATED APPLICATIONS

This application claims the benefit of and priority to the Korean Patent Applications No. 10-2019-0106983 filed on Aug. 30, 2019 and 10-2020-0096538 filed on Aug. 3, 2020, which are hereby incorporated by references as if fully set forth herein.

FIELD

The present disclosure relates to a wireless battery management system, and more particularly, to a wireless battery management system, a node for wireless communication, and a network establishment method, which quickly establish a short-range wireless network.

BACKGROUND

As the demand for portable electronic products such as notebook computers, video cameras, and portable phones increases rapidly and electric vehicles, storage batteries for storing energy, robots, and satellites are really developed, research on high-performance batteries capable of being repeatedly charged and discharged is being actively done.

A minimum unit of each battery may be referred to as a battery cell, and a plurality of battery cells serially connected to one another may configure a battery module. Also, a plurality of battery modules may be connected to one another in series or parallel, and thus, may configure a battery pack.

Generally, a battery pack equipped in electric vehicles and the like includes a plurality of battery modules connected to one another in series or parallel. The battery pack includes a battery management system which monitors a state of each of the battery modules and executes a control operation corresponding to the monitored state.

The battery management system includes a controller for obtaining and analyzing battery data. However, each of the battery modules included in the battery pack includes a plurality of battery cells, and due to this, there is a limitation in monitoring states of all of the battery cells included in the battery pack by using a single controller. Therefore, a method, where a controller is equipped in each of a certain number of battery modules included in a battery pack, one of the controllers is set as a master, and the other controllers are set as slaves, is being recently used for distributing a load of a controller and quickly and accurately monitoring a whole state of a battery pack.

A slave controller equipped in each of a certain number of battery modules is connected to a master controller over a wired communication network such as a control area network (CAN), collects battery data of a battery module controlled by the slave controller, and transmits the battery data to the master controller.

Technology, which sets a short-range wireless channel between the master controller and the slave controller and performs short-range wireless communication between the master controller and the slave controller, has been proposed for preventing the non-efficiency of a space occurring in a case where the CAN is built for communication between the master controller and the slave controller.

As described above, a battery management system includes one master controller and a plurality of slave controllers, and the plurality of slave controllers transmit battery data to the master controller periodically. However, in a case where the master controller and the slave controller are booted to establish a short-range wireless link therebetween, much time may be needed until the wireless link is established. Particularly, when there is a radio wave on the periphery, a process of selecting an appropriate communication channel is additionally needed, and due to this, time may be more delayed until the wireless link is established between the master controller and the slave controller.

SUMMARY

Accordingly, the present disclosure is directed to providing a wireless battery management system, a node for wireless communication, and a network establishment method that substantially obviate one or more problems due to limitations and disadvantages of the related art.

An aspect of the present disclosure is directed to providing a wireless battery management system, a node for wireless communication, and a network establishment method, which quickly establish a short-range wireless network between nodes, for transmitting and receiving battery data.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a wireless battery management system including: a manager node storing network configuration information when operating in a first mode, and when operating in a second mode, checking one or more monitor nodes being joined in a short-range wireless network using the network configuration information to establish the short-range wireless network along with each of the checked one or more monitor nodes; and one or more monitor nodes storing joining information for joining in the short-range wireless network when operating in the first mode, and when operating in the second mode, joining in the short-range wireless network on the basis of the joining information to transmit battery data to the manager node.

In another aspect of the present disclosure, there is provided a manager node including: a first wireless communication unit configured to communicate using a primary channel; a second wireless communication unit configured to communicate using a secondary channel; a manager storage storing network configuration information; and a manager controller configured to store the network configuration information in the manager storage when operating in a first mode, and when operating in a second mode, to check each monitor node to be joined in a short-range wireless network using the network configuration information and to establish the short-range wireless network for receiving battery data along with each checked monitor node by using at least one of the first wireless communication unit and the second wireless communication unit.

In another aspect of the present disclosure, there is provided a monitor node including: a wireless communication unit configured to perform wireless communication with a manager node; a monitor storage storing joining information; and a monitor controller configured to store the joining information in the monitor storage when operating in a first mode, when operating in a second mode, to set a dedicated slot in a data frame on the basis of dedicated slot information included in the joining information, to establish a short-range wireless network along with the manager node by setting a communication channel for the wireless communication unit on the basis of channel identification information included in the joining information, and to transmit battery data to the manager node during the set dedicated slot.

In another aspect of the present disclosure, there is provided a network establishment method including: broadcasting a joining request message and storing network configuration information including information about each monitor node which has responded to the joining request message when operating in a first mode; checking each monitor node joining in a short-range wireless network on the basis of the network configuration information and establishing the short-range wireless network along with each checked monitor node when operating in a second mode; and receiving battery data from each monitor node through the established short-range wireless network.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
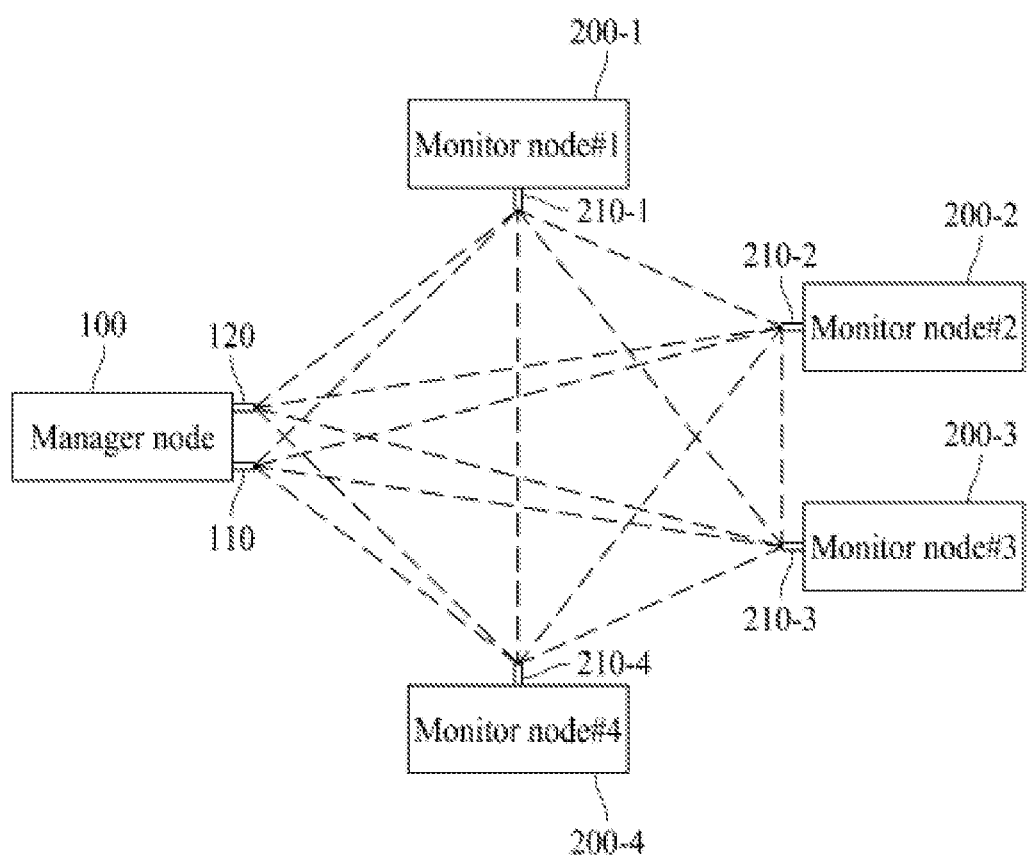
FIG. 1 is a diagram illustrating a wireless battery management system according to an embodiment of the present disclosure.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

FIG. 1 is a diagram illustrating a wireless battery management system according to an embodiment of the present disclosure.

As illustrated in FIG. 1, the wireless battery management system according to an embodiment of the present disclosure may include a manager node 100 and a plurality of monitor nodes 200-N. The manager node 100 and each of the monitor nodes 200-N may perform wireless communication therebetween.

In the wireless battery management system according to an embodiment, the manager node 100 may include a controller set as a master controller, and each of the monitor nodes 200-N may include a controller set as a slave controller.

In an embodiment, the manager node 100 and each of the monitor nodes 200-N may perform wireless communication therebetween according to a short-range wireless communication protocol based on IEEE 802.15.4+. In another embodiment, the manager node 100 and each of the monitor nodes 200-N may perform wireless communication therebetween according to a protocol based on one of IEEE 802.11, IEEE 802.15, and IEEE 802.15.4, or may perform wireless communication therebetween according to a short-range wireless protocol based on another scheme.

Each of the monitor nodes 200-N may be equipped in one or more battery modules each including a set of battery cells and may collect battery data including a voltage, a current, a temperature, humidity, and the like occurring in the battery module. Also, each of the monitor nodes 200-N may autonomously inspect a state of a battery module equipped with a corresponding monitor node by measuring an analog front end (AFE) of the battery module and inspecting a state (i.e., diagnostic test) of the battery module, thereby generating a self-diagnosis data including an inspection result.

The manager node 100 may receive battery data including one or more of a current, a voltage, a temperature, and self-diagnosis data from each of the monitor nodes 200-N and may analyze the received battery data to monitor a state of each battery module or a state of a battery pack. The manager node 100 may analyze the battery data of each battery module received from each of the monitor nodes 200-N to estimate the state (for example, state of charge (SOC) or state of health (SOH)) of each battery module and a whole state of the battery pack.

According to an embodiment of the present disclosure, the manager node 100 may include first and second wireless communication units 110 and 120. Each of the first and second wireless communication units 110 and 120 may include an antenna and a circuit for performing short-range wireless communication. The first wireless communication units 110 included in the manager node 100 may operate as a primary wireless communication unit and the second wireless communication unit 120 may operate as a secondary wireless communication unit. The first wireless communication unit 110 may establish a primary channel along with each of the monitor nodes 200-N by using a first frequency. The second wireless communication unit 120 may establish a secondary channel along with each of the monitor nodes 200-N by using a second frequency. Based on frequency interference between the primary channel and the secondary channel, the first frequency and the second frequency may be set to so that the difference between the first frequency and the second frequency is more than a predetermined value or more. Due to this, the primary channel and the secondary channel may be apart from each other.

Moreover, the manager node 100 may preferentially obtain the battery data of the battery module from each of the monitor nodes 200-N through the primary channel. When it is unable to communicate with a specific monitor node 200-N through the primary channel, the manager node 100 may obtain the battery data of the battery module from the specific monitor node 200-N through the secondary channel.

According to an embodiment of the present disclosure, the manager node 100 may establish a short-range wireless network for battery management. Also, the manager node 100 may check the number of monitor nodes 200-N joining in the short-range wireless network and may equally divide a transmission slot (see a transmission slot of FIG. 2) by the number of monitor nodes 200-N to generate one or more dedicated slots. The transmission slot may be a period which is assigned for data transmission by a plurality of monitor nodes, and the dedicated slot may be a period which is assigned to one monitor node and is available by only a single monitor node. Also, the short-range wireless network may be a personal network established based on the manager node 100, and a monitor node 200-N joining in the short-range wireless network may perform short-range wireless communication with the manager node 100. The number of monitor nodes 200-N joining in the short-range wireless network may be the same as the number of monitor nodes 200-N which are performing short-range wireless communication with the manager node 100.

The manager node 100 may assign a dedicated slot and a communication identification (ID) to each monitor node 200-N. The communication ID may be identification information used in only a short-range wireless network and may be managed by the manager node 100. The manager node 100 may communicate with the monitor nodes 200-N by using a data frame having a predefined format.

Figure 2:
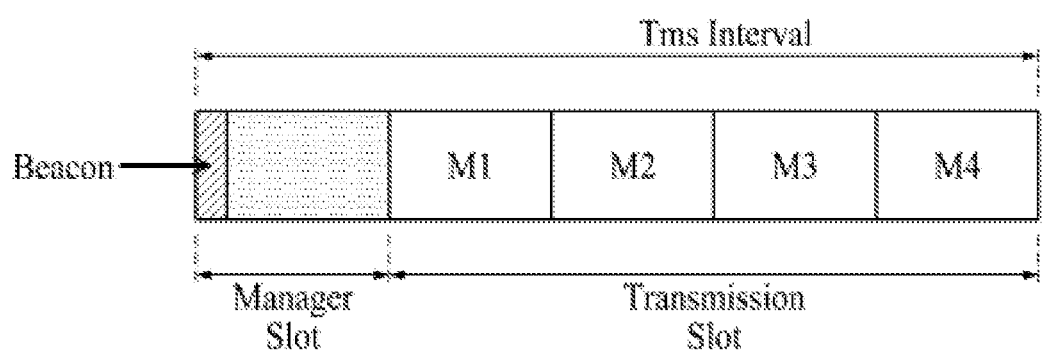
FIG. 2 is a diagram illustrating a data frame according to an embodiment of the present disclosure.

FIG. 2 is a diagram illustrating a data frame according to an embodiment of the present disclosure.

Referring to FIG. 2, a data frame used for wireless communication according to the present disclosure may include a plurality of time slots including a manager slot and a transmission slot and may have a certain time length Tms. A predetermined time period may be assigned to the manager slot and the transmission slot in the data frame, and an arrangement order of the manager slot and the transmission slot may be constant. In the data frame, a first-arranged manager slot may be a dedicated slot used for the manager node 100 and may include a beacon.

The beacon may perform a function of notifying the start of the data frame, and thus, may synchronize a slot timing. The manager node 100 may continuously transmit the beacon at a certain periodic interval. Each of the monitor nodes 200-N may recognize a start time of the data frame on the basis of the beacon and may extract the manager slot and the transmission slot each having a predetermined time from the data frame on the basis of the beacon.

A manager slot in the data frame may be a time slot which is used for the manager node 100 controlling the monitor nodes 200-N. During the manager slot, assignment information including a communication ID and dedicated slot information may be transmitted to the monitor nodes 200-N.

The transmission slot may be a time slot where battery data is transmitted and may be divided into a plurality of dedicated slots so as to be respectively assigned to the monitor nodes 200-N. The transmission slot may be equally divided into slots equal to the number of monitor nodes joining in the short-range wireless network (i.e., the number of monitor nodes which is communicating with the manager node), and a divided transmission slot (i.e., a dedicated slot) may be assigned for a specific monitor node 200-N. In FIG. 2, it is illustrated that a transmission slot may be divided into four periods, and in this case, M1 may be a dedicated slot which is assigned to a monitor node #1 200-1, M2 may be a dedicated slot which is assigned to a monitor node #2 200-2, M3 may be a dedicated slot which is assigned to a monitor node #3 200-3, and M4 may be a dedicated slot which is assigned to a monitor node #4 200-4.

Information about each of time slots included in the data frame may be previously stored in each of the monitor node 200-N and the manager node 100. For example, in a process of releasing a product, a slot length of the data frame, a length of the manager slot, and a length of the transmission slot may be previously stored in each of the monitor nodes 200-N and the manager node 100.

The manager node 100 may operation in a first mode or a second mode. The first mode may be a mode for previously obtaining network configuration information before the wireless battery management system operates substantially, and may be performed before the second mode. The second mode may be a mode where the wireless battery management system operates substantially, and in the second mode, a short-range wireless network may be quickly established by using network configuration information which is obtained in the first mode.

When operating in the first mode, the manager node 100 may broadcast a message for issuing a request to join in a network and may check each of the monitor nodes 200-N which has responded to joining in the network. The manager node 100 may assign a dedicated slot and a communication ID for each of the monitor nodes 200-N which has responded to joining in the network, generate network configuration information including dedicated slot information and a communication ID of each monitor node 200-N, and store the generated network configuration information in a non-volatile memory (for example, flash memory). Also, when operating in the second mode, the manager node 100 may quickly establish a short-range wireless network on the basis of the network configuration information stored in the first mode to wirelessly communicate with each of the monitor nodes 200-N.

Each of the monitor nodes 200-N may include one wireless communication unit 210-N, and each of the monitor nodes 200-N may communicate with the manager node 100 by using the wireless communication unit 210-N and may communicate with a peripheral monitor node 200-N. Each of the monitor nodes 200-N may collect battery data including one or more of a self-diagnosis result and sensing information (for example, a temperature, humidity, a voltage, a current, etc.) about one or more battery modules equipped with a corresponding monitor node 200-N and may report the battery data to the manager node 100.

Each of the monitor nodes 200-N may preferentially communicate with the manager node 100 through a primary channel. In a case which performs communication through the primary channel, a wireless link may be established between the first wireless communication unit 110 of the manager node 100 and the wireless communication unit 210-N of each of the monitor nodes 200-N. When a communication state of the primary channel is abnormal, the monitor nodes 200-N may communicate with the manager node 100 by using a secondary channel instead of the primary channel.

When operating in the first mode, the monitor nodes 200-N may receive a message for issuing a request to join in a network from the manager node 100. The monitor nodes 200-N may transmit a joining response message including identification information (for example, a medium access control (MAC) address) thereof to the manager node 100 to join in a short-range wireless network. Also, when the monitor node 200-N receives assignment information including a communication ID and dedicated slot information from the manager node 100, the monitor nodes 200-N may generate joining information including the communication ID and the dedicated slot information. The monitor nodes 200-N may store the generated joining information in the non-volatile memory (for example, flash memory). Subsequently, when operating in the second mode, the monitor nodes 200-N may quickly join in the short-range wireless network established by the manager node 100 on the basis of the joining information to establish a wireless link along with the manager node 100.

Figure 3:
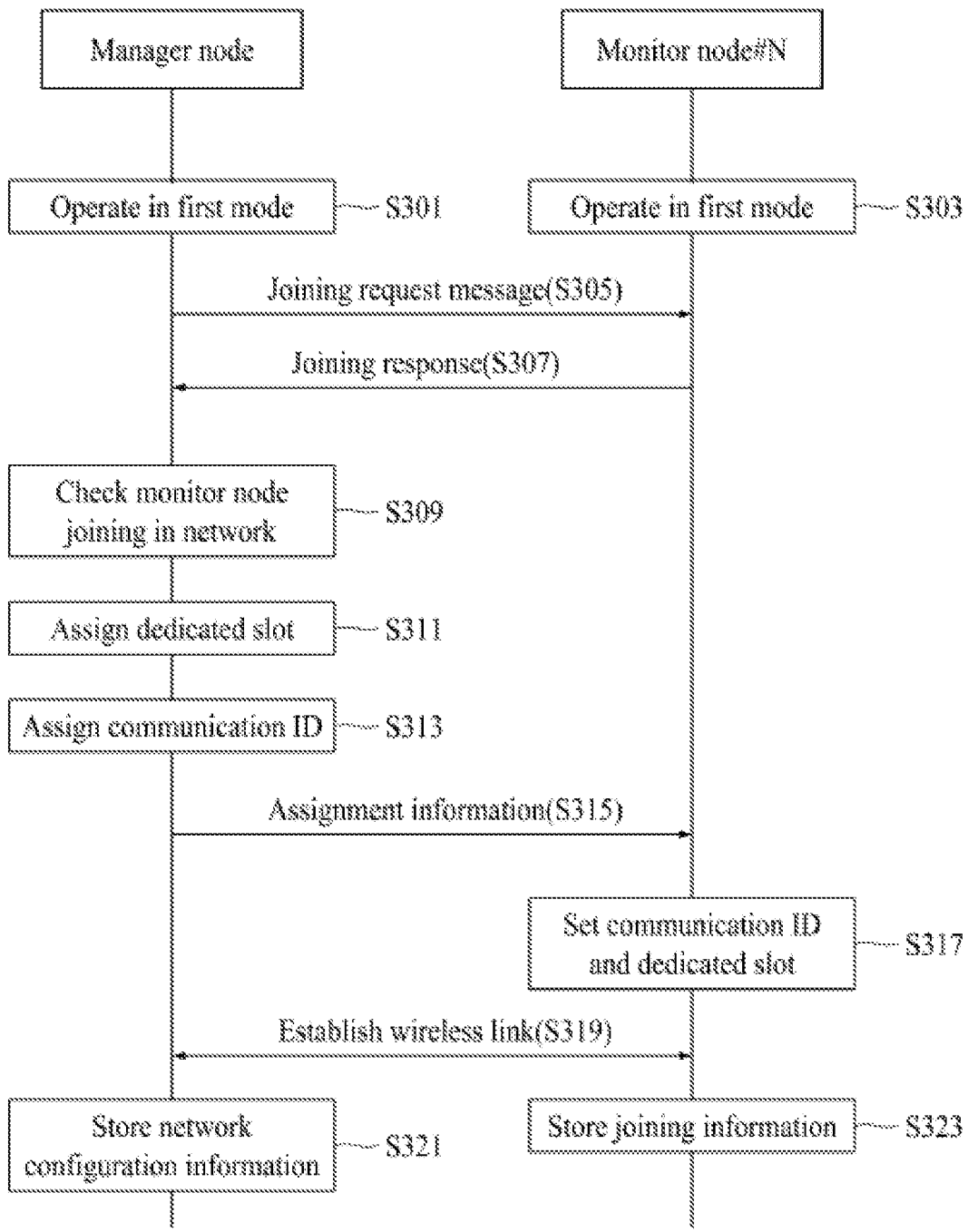
FIG. 3 is a flowchart describing a method of storing network configuration information and joining information by using a wireless battery management system operating in a first mode, according to an embodiment of the present disclosure.

FIG. 3 is a flowchart describing a method of storing network configuration information and joining information by using a wireless battery management system operating in a first mode, according to an embodiment of the present disclosure.

Referring to FIG. 3, when network configuration information or joining information is not stored in the non-volatile memory or an operation based on the first mode is input from a user, the manager node 100 and the monitor nodes 200-N may operate in the first mode to start a process based thereon in operations S301 and S303. To provide an additional description, when the network configuration information is not stored in the non-volatile memory, the manager node 100 may operate in the first mode so as to obtain the network configuration information, or when the operation based on the first mode is input from the user, the manager node 100 may operate in the first mode. Similarly, when the joining information is not stored in the non-volatile memory, the monitor nodes 200-N may operate in the first mode so as to obtain the joining information, or when the operation based on the first mode is input from the user, the monitor nodes 200-N may operate in the first mode.

When the first mode is performed, the manager node 100 may broadcast a message for issuing a request to join in a short-range wireless network, to peripheral monitor nodes 200-N in operation S305. In this case, the manager node 100 may broadcast the joining request message by using at least one of the first wireless communication unit 110 and the second wireless communication unit 120. The manager node 100 may set a communication channel of the first wireless communication unit 110 to a default primary channel and may set a communication channel of the second wireless communication unit 120 to a default secondary channel. The manager node 100 may add a short-range wireless network ID to the joining request message. The short-range wireless network ID may include a service set identifier (SSID). Also, the manager node 100 may detect energy to check whether there is a monitor nodes 200-N on the periphery, and only when there is the monitor nodes 200-N on the periphery, the manager node 100 may broadcast the joining request message.

When operating in the first mode, the monitor nodes 200-N may wait for receiving the joining request message received from the manager node 100. The monitor nodes 200-N, as described below, may set a communication channel of the wireless communication unit 210-N to a default primary channel or a default secondary channel and may receive the joining request message from the manager node 100.

When each of the monitor nodes 200-N determines to join in the short-range wireless network established by the manager node 100, each of the monitor nodes 200-N may transmit a joining response message including identification information (for example, an MAC address) thereof to the manager node 100 in operation S307. The monitor nodes 200-N may transmit the joining response message to the manager node 100 at a time at which a data collision does not occur, based on carrier sense multiple access with collision avoidance (CSMA/CA) because a dedicated slot is not assigned to the monitor node 200-N.

When the manager node 100 receives the joining response message normally, the manager node 100 may transmit acknowledge (ACK) corresponding to the joining response message, to a corresponding monitor node 200-N. Also, when the manager node 100 determines to change a primary channel and a secondary channel because the default primary channel is abnormal, the manager node 100 may add, to the ACK, identification information about a primary channel to be changed and a secondary channel to be changed.

Subsequently, the manager node 100 may check and count identification information about the monitor nodes 200-N in each joining response message to check the number of monitor nodes 200-N in operation S309. Subsequently, the manager node 100 may equally divide a transmission slot included in a data frame on the basis of the number of monitor nodes to generate a plurality of dedicated slots for each of the monitor nodes 200-N. The manager node 100 may individually assign the plurality of dedicated slots for the monitor nodes 200-N so that a time sequence (i.e., an arrangement sequence) of the plurality of dedicated slots matches a joining response sequence of the monitor nodes 200-N in operation S311. Also, the manager node 100 may assign a communication ID, having a small digit or a character string in the sequence of an early response to a late response, to each of the monitor nodes 200-N in operation S313. The communication ID may be an ID of a monitor node 200-N used in the short-range wireless network and may have a length which is far shorter than identification information (for example, an MAC address) of the monitor node 200-N, and the manager node 100 may identify each of the monitor nodes 200-N on the basis of the communication ID.

To describe an example with reference to FIG. 2, the manager node 100 may divide a transmission slot into four slots, assign a dedicated slot M1 of a first period to the monitor node #1 200-1 which has first responded, and assign a digit '1' as a communication ID for the monitor node #1 200-1. The manager node 100 may assign a dedicated slot M2 of a second period to the monitor node #2 200-2 which has second responded and may assign a digit '2' as a communication ID for the monitor node #2 200-2. Also, the manager node 100 may assign a dedicated slot M3 of a third period to the monitor node #3 200-3 which has third responded and may assign a digit '3' as a communication ID for the monitor node #3 200-3. Also, the manager node 100 may assign a dedicated slot M4 of a fourth period to the monitor node #4 200-4 which has latest responded and may assign a digit '4' as a communication ID for the monitor node #4 200-4.

The manager node 100 may transmit assignment information including dedicated slot information and a communication ID to a corresponding monitor node 200-N in operation S315. The manager node 100 may add a start point and an end point of a dedicated slot assigned to the corresponding monitor node 200-N in the dedicated slot information, or may add the number of divisions of a transmission slot and assignment position (for example, an $n^{th}$ position) of dedicated slot assigned to the corresponding monitor node 200-N in the dedicated slot information.

Subsequently, the monitor nodes 200-N may check a communication ID and dedicated slot information in the assignment information received from the manager node 100, and then, may set the communication ID to its own ID and may set a period corresponding to the dedicated slot information of a total period of a transmission slot to its own dedicated slot in operation S317. When the dedicated slot information includes a start point and an end point, the monitor nodes 200-N may set a period corresponding to the start point and the end point of the total period of the transmission slot to its own dedicated slot. In another embodiment, when the dedicated slot information includes the number of divisions and the assignment position, the monitor nodes 200-N may equally divide the transmission slot into periods equal to the number of divisions, and then, may set a period corresponding to the assignment position among the divided periods, to its own dedicated slot.

Subsequently, the manager node 100 may establish a wireless link along with each of the monitor nodes 200-N, and thus, may allow each monitor node 200-N to join in the short-range wireless network in operation S319. When each monitor node 200-N joins in the short-range wireless network normally, the manager node 100 may generate network configuration information including a communication ID, dedicated slot information of each monitor node 200-N, and the identification information about the primary channel and the secondary channel which are used to establish the short-range wireless network and may store the network configuration information in operation S321. Also, each of the monitor nodes 200-N may generate and store joining information which includes the communication ID assigned from the manager node 100, the dedicated slot information, the identification information about the primary channel, the identification information about the secondary channel, and a short-range wireless network ID in operation S323. Subsequently, the manager node 100 and the monitor nodes 200-N may release the wireless link to end the operation based on the first mode.

As described above, in the first mode, when the manager node 100 establishes the short-range wireless network and is normally connected to the monitor nodes 200-N joining in the short-range wireless network, the manager node 100 may generate and store the network configuration information, and the monitor nodes 200-N may generate and store the joining information.

Figure 4:
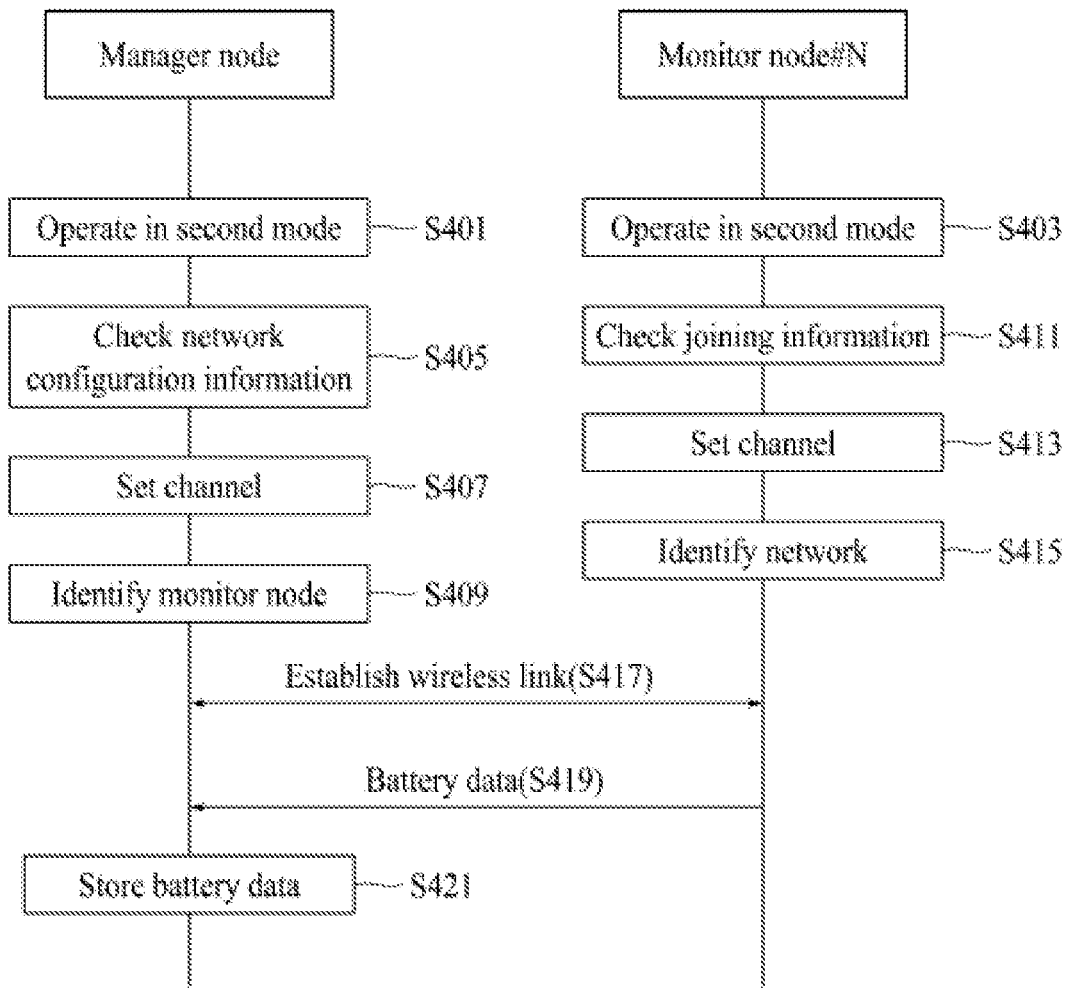
FIG. 4 is a flowchart describing a method of quickly establishing a short-range wireless network by using a wireless battery management system operating in a second mode, according to an embodiment of the present disclosure.

FIG. 4 is a flowchart describing a method of quickly establishing a short-range wireless network by using a wireless battery management system operating in a second mode, according to an embodiment of the present disclosure.

Referring to FIG. 4, when network configuration information or joining information is previously stored in the non-volatile memory or an operation based on the second mode is input from a user, the manager node 100 and the monitor nodes 200-N may operate in the second mode to start a process based thereon in operations S401 and S403. To provide an additional description, the manager node 100 may operate in the second mode when the network configuration information is stored in the non-volatile memory, or the manager node 100 may operate in the second mode when the operation based on the second mode is input from the user. Similarly, the monitor nodes 200-N may operate in the second mode when the joining information is stored in the non-volatile memory, or the monitor nodes 200-N may operate in the second mode when the operation based on the second mode is input from the user.

The manager node 100 may check the network configuration information which is stored in the first mode in operation S405. The manager node 100 may set a communication channel of the first wireless communication unit 110 to correspond to identification information about a primary channel included in the network configuration information and may set a communication channel of the second wireless communication unit 120 to correspond to identification information about a secondary channel included in the network configuration information in operation S407. Subsequently, based on dedicated slot information and a communication ID of each monitor node included in the network configuration information, the manager node 100 may identify each of the monitor nodes 200-N joining in a short-range wireless network and may identify a dedicated slot used by each monitor node 200-N in operation S409.

The monitor nodes 200-N may check joining information which is stored in the first mode in operation S411 and may check identification information about a primary channel and identification information about a secondary channel, which are included in the joining information. The monitor nodes 200-N may set a communication channel of the wireless communication unit 210-N to correspond to the identification information about the primary channel in operation S413. When it is unable to communicate with the manager node 100 by using the primary channel, the monitor node 200-N may change the communication channel of the wireless communication unit 210-N to correspond to the identification information about the secondary channel.

Subsequently, in operation S415, the monitor nodes 200-N may check an ID of the short-range wireless network in the joining information to identify a network which the monitor node 200-Ns desire to join in. Also, the monitor nodes 200-N may check a communication ID and dedicated slot information in the joining information and may set the communication ID to an ID of the corresponding monitor node 200-N. Also, the monitor nodes 200-N may set a period corresponding to the dedicated slot information in a transmission slot of a data frame, to a dedicated slot thereof.

When the manager node 100 broadcasts a network joining request message including a network ID in a state where monitor nodes 200-N joining in the short-range wireless network are identified, the monitor nodes 200-N may immediately transmit a joining response message to the manager node 100 because the network ID is previously stored in the joining information.

Moreover, without assigning separate information (i.e., a dedicated slot and a communication ID) again, the manager node 100 may quickly allow the monitor nodes 200-N to join in the short-range wireless network and may establish a short-range wireless link along with each of the monitor nodes 200-N in operation S417. In this case, the manager node 100 may identify monitor nodes 200-N registered in the network configuration information and may establish a short-range wireless link on the basis of only the identified monitor nodes 200-N. Subsequently, in operation S419, the monitor nodes 200-N may obtain battery data and may transmit the obtained battery data to the manager node 100 during a dedicated slot thereof. At this time, the monitor nodes 200-N may transmit the battery data together with a communication ID thereof to the manager node 100. The battery data may be transmitted to the manager node 100 in the form of data frame.

Then, the manager node 100 may store battery data sequentially received from each monitor node 200-N and may analyze the battery data to monitor a state of each battery module in operation S421. The manager node 100 may extract battery data transmitted by a corresponding monitor node 200-N on the basis of dedicated slot information for each monitor node 200-N included in the network configuration information.

Battery data may be collected at a certain periodic interval. To provide an additional description, the manager node 100 may transmit a message for issuing a request to report data at a certain interval, to each monitor node 200-N, and thus, each monitor node 200-N may collect the battery data per the interval and may transmit the collected battery data to the manager node 100.

As described above, in a case where the wireless battery management system operates in the second mode, the manager node 100 may not perform a process of assigning a communication ID and a dedicated slot and may quickly establish a short-range wireless network along with the monitor nodes 200-N on the basis of the previously-stored network configuration information. Also, the monitor nodes 200-N may not perform a process of receiving assignment information and may quickly join in the short-range wireless network on the basis of the previously-stored joining information.

Figure 5:
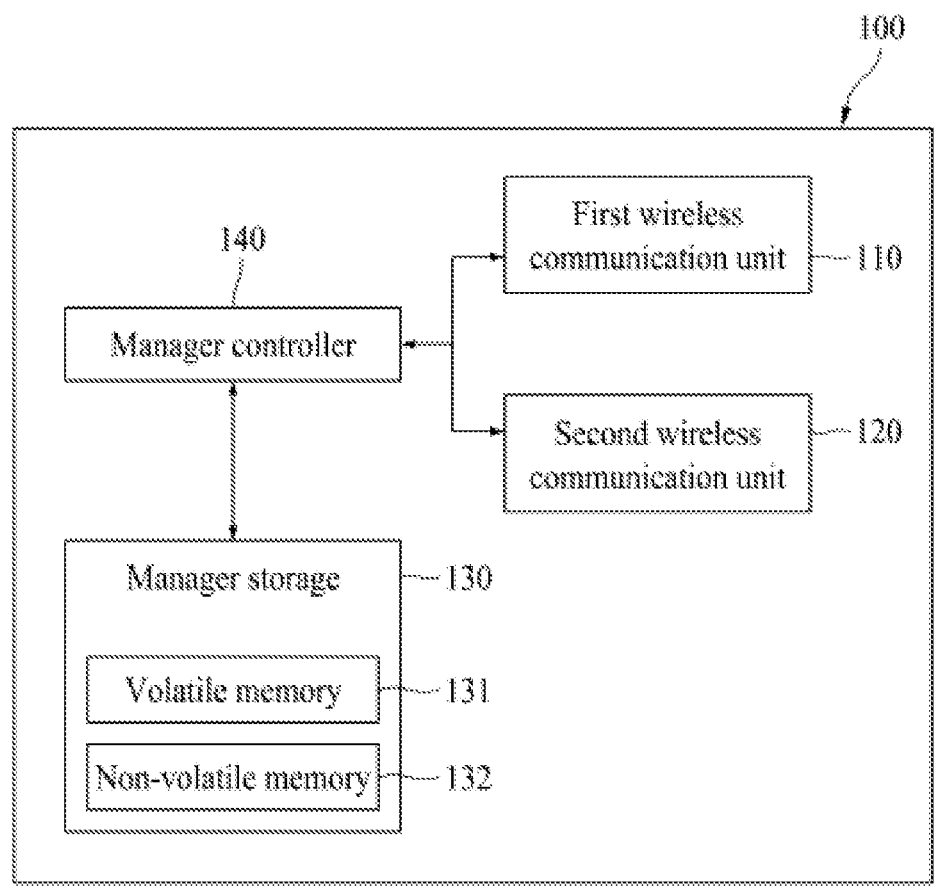
FIG. 5 is a diagram illustrating a configuration of a manager node according to an embodiment of the present disclosure.

FIG. 5 is a diagram illustrating a configuration of a manager node 100 according to an embodiment of the present disclosure.

As illustrated in FIG. 5, the manager node 100 according to an embodiment of the present disclosure may include a first wireless communication unit 110, a second wireless communication unit 120, a manager storage 130, and a manager controller 140.

The first wireless communication unit 110 may communicate with the monitor nodes 200-N through a specific communication channel.

The second wireless communication unit 120 may communicate with the monitor nodes 200-N through a channel which differs from a communication channel of the first wireless communication unit 110.

The first wireless communication unit 110 and the second wireless communication unit 120 may each include a radio frequency (RF) circuit for performing short-range wireless communication. Also, the first wireless communication unit 110 and the second wireless communication unit 120 may each broadcast a beacon at certain periods. A beacon transmitted by the first wireless communication unit 110 may have a transmission timing which is the same as or different from that of a beacon transmitted by the second wireless communication unit 120.

The manager storage 130 may be a storage means such as a disk device or a memory and may store various programs and data for operating the manager node 100. Particularly, the manager storage 130 may store a program (or an instruction set) where an algorithm for executing an operation of the manager node 100 is defined. Also, the manager storage 130 may store battery data received from each of the monitor nodes 200-N.

The manager storage 130 may include a volatile memory 131 and a non-volatile memory 132. The non-volatile memory 132 may be flash memory, a hard disk, or the like and may store battery data, the program (or the instruction set), and network configuration information. The network configuration information may include dedicated slot information for each monitor node 200-N, a communication ID for each monitor node 200-N, identification information about a primary channel, and identification information about a secondary channel. Also, the non-volatile memory 132 may store default information. The default information may include identification information about a default primary channel, identification information about a default secondary channel, and identification information about a temporary channel, which are set to default in the first mode, and moreover, may include a network ID and lifetime. The network ID may be identification information about the short-range wireless network established by the manager node 100, and the lifetime may be a maximum value of a time for waiting for until a response is received from each monitor node 200-N.

The volatile memory 131 may be random access memory (RAM) and may load data needed for processing by a processor or may store temporary data. The volatile memory 131 may temporarily store changed network configuration information.

The manager controller 140, as an operation processing device such as a microprocessor, may control an overall operation of the manager node 100 and may generate data for controlling the monitor nodes 200-N. The manager controller 130 may move data associated with the program (or the instruction set) stored in the volatile memory 131 to the non-volatile memory 132 and may perform an operation based on each of the first mode and the second mode according to an embodiment of the present disclosure.

The manager controller 140 may obtain battery data of each monitor node 200-N by using the first wireless communication unit 110 or the second wireless communication unit 120 and may analyze states of battery modules equipped with the monitor nodes 200-N by analyzing the battery data. Also, the manager controller 140 may overall analyze each battery data to check a state of a battery pack, thereby controlling charging and discharging.

According to an embodiment of the present disclosure, the manager controller 140 may set a frequency of the first wireless communication unit 110 to a first frequency of a primary channel and may establish a short-range wireless link along with each monitor node 200-N by using the first wireless communication unit 110. Also, the manager controller 140 may set a frequency of the second wireless communication unit 120 to a second frequency of a secondary channel and may establish a short-range wireless link along with each monitor node 200-N by using the second wireless communication unit 120. Also, the manager controller 140 may communicate with each monitor node 200-N by preferentially using the first wireless communication unit 110, and when it is unable to communicate with a specific monitor node 200-N through the primary channel (i.e., using the first wireless communication unit 110), the manager controller 140 may communicate with the specific monitor node 200-N by using the secondary channel established by the second wireless communication unit 120.

When the quality of the primary channel is defective, the manager controller 140 may search for channels other than the primary channel and the secondary channel by using the second wireless communication unit 120 or the first wireless communication unit 110, evaluate the quality of each of the channels, and re-set a channel, having best quality among the channels, to a primary channel. Also, the manager controller 140 may re-set a channel, having best quality among channels which have a difference equal to or higher than a predetermined separation frequency with respect to the re-set primary channel, to a secondary channel.

The manager controller 140 may perform energy detection and frame detection on each of the searched channels, apply a first weight value to an energy detection result value for each searched channels, apply a second weight value to a frame detection result value for each searched channels, and summate a weight-applied energy detection result value and a weight-applied frame detection result value to digitize the quality of each searched channels, thereby evaluating the quality of each searched channel. The energy detection may be an operation of detecting an energy level of a frequency used in a corresponding channel. In the energy detection a dB-unit result value may be obtained, and as a dB value is higher, the amount of use of a channel may be high. Also, the frame detection may be an operation of checking whether a preamble is detected from a corresponding channel, and in this case, frame detection or frame non-detection may be obtained as a result value. A case where the preamble is detected may be a case where a data frame modulated by the same manner as a modulation manner used by the manager node 100 occurs in another channel. To provide an additional description, the manager node 100 and the monitor nodes 200-N may modulate and transmit a data frame and may receive and demodulate a modulated data frame by using the same modulation/demodulation manner. However, in a case where the manager node 100 can normally demodulate a data frame occurring in another channel other than a primary channel and a secondary channel to detect a preamble, a data collision may occur when using the another channel, and thus, a low weight value may be applied to a corresponding channel. As a result, a communication channel set to a primary channel may be a channel where a frame is not detected and an energy detection value is lowest.

The manager controller 140 may perform different processes on the basis of the first mode or the second mode. That is, when the manager node 100 operates in the first mode, the manager controller 140 may exchange data with peripheral monitor nodes 200-N to generate network configuration information and may store the network configuration information in the non-volatile memory 132. Also, when the manager node 100 operates in the second mode, the manager controller 140 may quickly establish a short-range wireless network by using the network configuration information and may establish a wireless link along with each monitor node 200-N.

Figure 6:
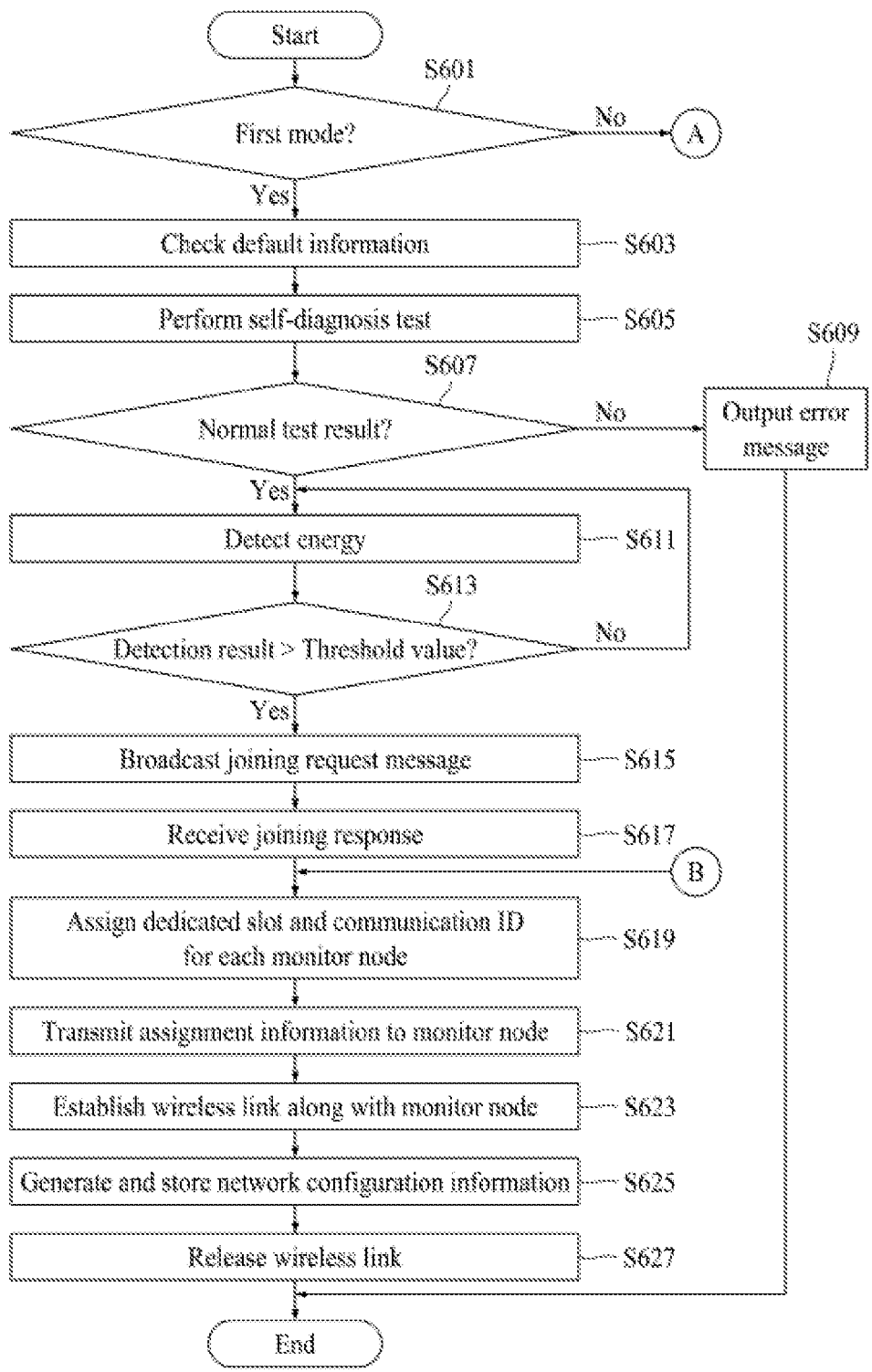
FIG. 6 is a flowchart describing a method of generating and storing network configuration information by using a manager node operating in the first mode, according to an embodiment of the present disclosure.

FIG. 6 is a flowchart describing a method of generating and storing network configuration information by using a manager node operating in the first mode, according to an embodiment of the present disclosure.

Referring to FIG. 6, when the manager node 100 is powered on to operate, the manager controller 140 may determine whether a mode of the manager node 100 is the first mode or the second mode in operation S601. When the mode of the manager node 100 is the second mode, the manager controller 140 may perform a process illustrated in FIG. 8.

On the other hand, when the mode of the manager node 100 is the first mode, the manager controller 140 may check default information in the non-volatile memory 132 in operation S603. When network configuration information is not stored in the non-volatile memory 132 or an operation based on the first mode is input from a user, the manager node 100 may determine that the manager node 100 operates in the first mode.

The manager controller 140 may perform a self-diagnosis test on hardware of the manager node 100 in operation S605. The manager controller 140 may perform a test on each of an RF chip included in each of the first and second wireless communication units 110 and 120, a memory or a disk device included in the manager storage 130, and an input/output (I/O) port. In this case, the manager controller 140 may apply a predetermined test pattern signal to the RF chip, the memory, and an external I/O port and may compare a stored normal signal with a signal responding thereto to perform a self-diagnosis test. When at least one of the self-diagnosis test results are not normal in operation S607 (No), the manager controller 140 may output an error message including a self-diagnosis result to notify an operator that a defect occurs in the manager node 100 in operation S609.

On the other hand, when all results of the self-diagnosis test are normal in operation S607 (Yes), the manager controller 140 may check identification information about a default primary channel and identification information about a default secondary channel which are set to default in default information and based on the checked identification information, the manager controller 140 may set a communication channel of the first wireless communication unit 110 to the default primary channel and may set a communication channel of the second wireless communication unit 120 to the default secondary channel. Also, the manager controller 140 may perform energy detection by using the first wireless communication unit 120 to check an energy level of a frequency used in the default primary channel in operation S611.

Subsequently, the manager controller 140 may determine whether an energy level of a frequency which is a result value of the energy detection is greater than a predetermined threshold value in operation S613, and when the energy level of the frequency is not greater than the predetermined threshold value, the manager controller 140 may determine that monitor nodes do not operate, and after a certain time elapses, may perform the energy detection again. The manager controller 140 may repeatedly perform energy detection for a lifetime included in the default information.

On the other hand, when the energy level of the frequency is greater than the predetermined threshold value, the manager controller 140 may determine that the monitor nodes operate and may broadcast a joining request message including an ID of a short-range wireless network in operation S615. In this case, the manager controller 140 may broadcast the joining request message by using the first wireless communication unit 110 and may additionally broadcast the joining request message by using the second wireless communication unit 120.

The manager controller 140 may receive a joining response message from one or more monitor nodes 200-N which have determined to join in the short-range wireless network in operation S617. Then, the manager controller 140 may check and count identification information (for example, an MAC address) about the monitor nodes 200-N in the joining response message to check the number of monitor nodes 200-N joining in the short-range wireless network. Subsequently, the manager controller 140 may equally divide a time slot in a data frame on the basis of the number of monitor nodes 200-N to generate a plurality of dedicated slots equal to the number of monitor nodes 200-N. Also, the manager controller 140 may respectively assign a dedicated slot for each of the monitor nodes 200-N so that a time sequence of the generated dedicated slots matches a response sequence of the monitor nodes 200-N and may assign a communication ID for each of the monitor nodes 200-N in operation S619. In this case, the manager controller 140 may assign a communication ID, having a small digit or a character string in the sequence of an early response to a late response, to each of the monitor nodes 200-N.

Subsequently, the manager controller 140 may generate assignment information including a communication ID and dedicated slot information for each monitor node 200-N and may transmit the assignment information to a corresponding monitor node 200-N by using the first wireless communication unit 110 in operation S621. When there is a monitor node 200-N which has established a wireless link through the second wireless communication unit 120, the manager controller 140 may transmit the assignment information to a corresponding monitor node 200-N by using the second wireless communication unit 120. The manager controller 140 may control the first wireless communication unit 110 or the second wireless communication unit 120 so that the assignment information is transmitted to a corresponding monitor node 200-N during a manager slot. The manager controller 140 may add a start point and an end point of a dedicated slot to the dedicated slot information, or may add the number of divisions of the transmission slot and assignment position (for example, an $n^{th}$ position) in the dedicated slot information.

Subsequently, the manager controller 140 may establish a wireless link along with each monitor nodes 200-N which has determined to join in the short-range wireless network, by using at least one of the first wireless communication unit 110 and the second wireless communication unit 120 in operation S623. When the manager controller 140 establishes a wireless link along with the monitor nodes 200-N and each of the monitor nodes 200-N joins in the short-range wireless network normally, the manager controller 140 may generate network configuration information including communication ID for each monitor node 200-N, dedicated slot information for each monitor node 200-N, and identification information about a primary channel and identification information about a secondary channel which are used to establish the short-range wireless network and may store the network configuration information in the non-volatile memory 132 in operation S625. Also, the manager controller 140 may release the wireless link along with each monitor node 200-N to end the first mode in operation S627.

As described below, the manager controller 140 may scan a primary channel and a secondary channel, which are to be changed. In this case, in the first mode, the manager controller 140 may change a communication channel of the first wireless communication unit 110 and a communication channel of the second wireless communication unit 120, transmit the assignment information to a corresponding monitor node 200-N by using at least one of the first wireless communication unit 110 and the second wireless communication unit 120, and establish a wireless link along with each monitor node 200-N through the changed communication channel. The manager controller 140 may set a channel change timing, transmit a message including the channel change timing to each monitor node 200-N, and change the communication channel of the first wireless communication unit 110 and the communication channel of the second wireless communication unit 120 at the channel change timing. When the wireless link is normally established along with each monitor node 200-N through a changed communication channel, the manager controller 140 may generate network configuration information including identification information about a primary channel which has been changed and identification information about a secondary channel which has been changed and may store the network configuration information in the nonvolatile memory 132.

Figure 7:
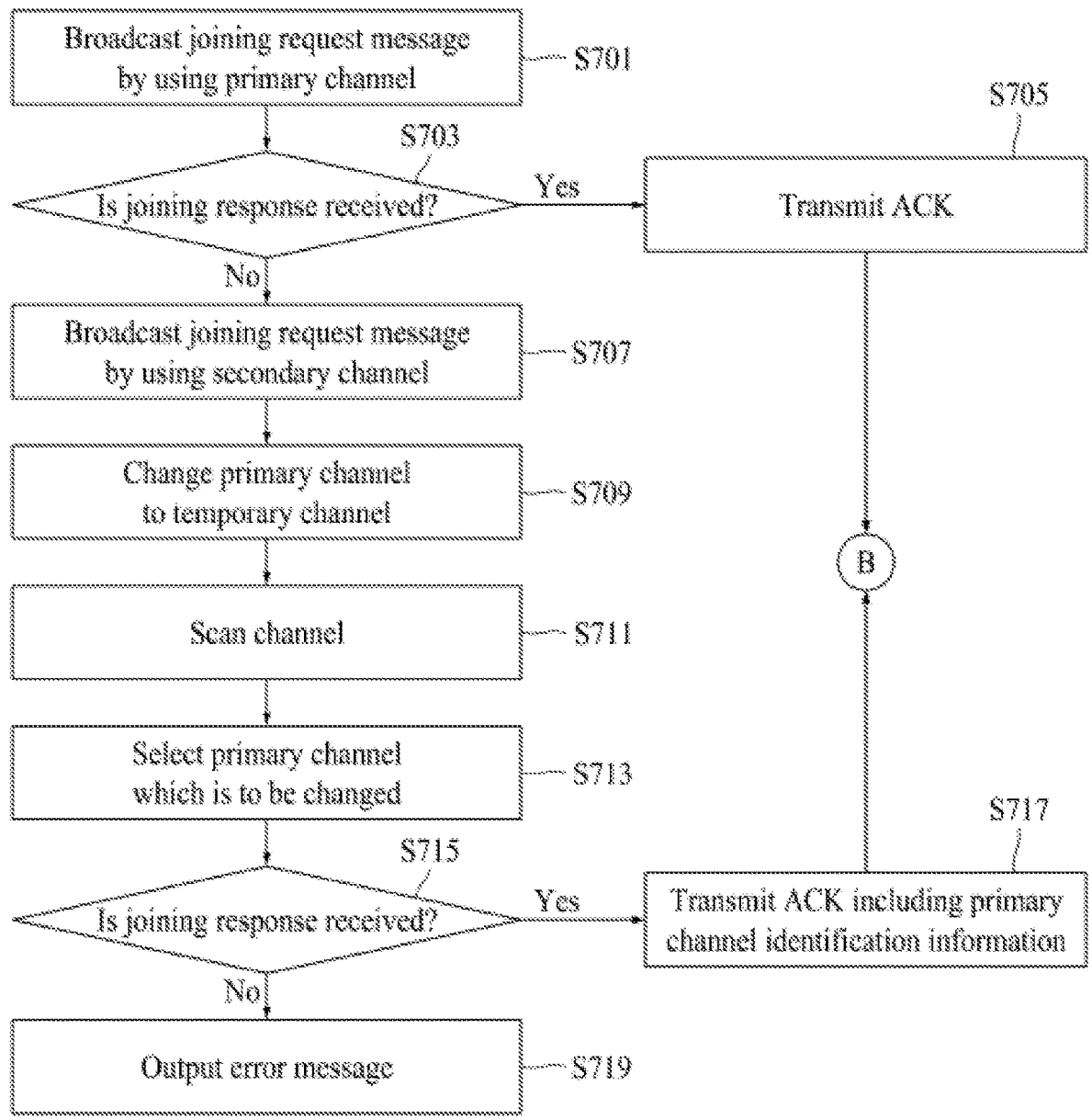
FIG. 7 is a flowchart describing a method of changing a primary channel by using a manager node, according to an embodiment of the present disclosure.

FIG. 7 is a flowchart describing a method of changing a primary channel by using a manager node, according to an embodiment of the present disclosure.

Referring to FIG. 7, in operation S701, the manager controller 140 may broadcast a joining request message including a short-range wireless network ID by using the first wireless communication unit 110 set to a default primary channel.

Subsequently, in operation S703, the manager controller 140 may monitor whether the joining response message is received from each monitor node 200-N through the first wireless communication unit 110 within a predetermined time. When the first wireless communication unit 110 receives the joining response message from each monitor node 200-N, the manager controller 140 may transmit ACK to a corresponding monitor node 200-N by using the first wireless communication unit 110 in operation S705 and may perform a process from operation S619 of FIG. 6.

On the other hand, when the first wireless communication unit 110 does not receive the joining response message from the monitor node 200-N within the predetermined time, the manager controller 140 may again broadcast the joining request message including the short-range wireless network ID by using the second wireless communication unit 120 set to a default secondary channel in operation S707. When interference or a data collision occurs in the primary channel, the joining request message may be broadcasted through the default secondary channel.

Subsequently, in operation S709, the manager controller 140 may change the communication channel of the first wireless communication unit 110 to a temporary channel which is previously set from the default primary channel. The manager controller 140 may change the communication channel of the first wireless communication unit 110 to the temporary channel on the basis of identification information about the temporary channel included in default information. The manager controller 140 may scan channels other than the default primary channel and the default secondary channel by using the first wireless communication unit 110 or the second wireless communication unit 120 and may evaluate the quality of each of the scanned channels in operation S711. In order to evaluate the quality of channels, the manager node 100 may search for channels by using the first wireless communication unit 110 or the second wireless communication unit 120 and may perform energy detection and frame detection on each of searched channels. The manager controller 140 may apply a first weight value to an energy detection result value, apply a second weight value to a frame detection result value, and summate a weight-applied energy detection result value and a weight-applied frame detection result value to evaluate the quality of a corresponding searched channel. The first weight value may be applied to the energy detection result value so that a quality evaluation value of a channel increases as an energy detection result value of the channel is reduced, and when a frame is not detected in a channel, the second weight value may be applied to the frame detection result value so that the quality evaluation value of the channel increases. Accordingly, a channel where a frame is not detected and an energy detection result value is low may have a high grade.

Subsequently, in operation S713, the manager controller 140 may set a channel having a highest quality evaluation value among the searched channels to a primary channel which is to be changed and may set a channel having a highest quality evaluation value among channels which have a difference equal to or higher than a predetermined separation frequency with respect to the primary channel which is to be changed, to a secondary channel which is to be changed. Therefore, the manager controller 140 may set a channel where a frame is not detected and an energy result value is low to the primary channel. The primary channel and the secondary channel which are to be changed may each be a channel which is used in the second mode.

Subsequently, in operation S715, the manager controller 140 may monitor whether the joining response message is received from the monitor node 200-N through the second wireless communication unit 120 set to the default secondary channel or the first wireless communication unit 110 set to a temporary channel. When the second wireless communication unit 120 or the first wireless communication unit 110 receives the joining response message from the monitor node 200-N, the manager controller 140 may transmit ACK including identification information about the primary channel to be changed and identification information about the secondary channel to be changed to a corresponding monitor node 200-N and may notify the monitor node 200-N of a primary channel and a secondary channel to be used in the second mode. In this case, the manager controller 140 may add a channel change timing to the ACK. Also, the manager controller 140 may change the communication channel of the first wireless communication unit 110 and the communication channel of the second wireless communication unit 120 at the channel change timing.

When the joining response message is not received through the second wireless communication unit 120 set to the default secondary channel or the first wireless communication unit 110 set to the temporary channel, the manager controller 140 may output an error message to request a check from an operator in operation S719.

Figure 8:
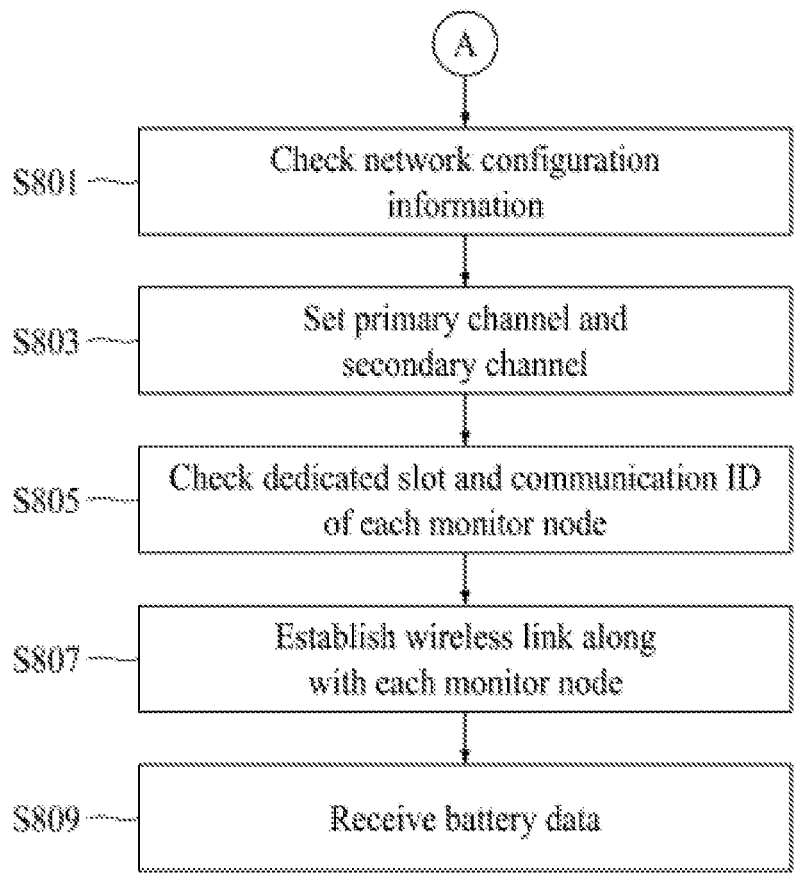
FIG. 8 is a flowchart describing a method of quickly establishing a network by using a manager node operating in the second mode, according to an embodiment of the present disclosure.

FIG. 8 is a flowchart describing a method of quickly establishing a network by using a manager node operating in the second mode, according to an embodiment of the present disclosure.

Referring to FIG. 8, when the manager controller 140 operates in the second mode, the manager controller 140 may check network configuration information in the nonvolatile memory 132 in operation S801. Subsequently, the manager controller 140 may set a communication channel of the first wireless communication unit 110 to correspond to identification information about a primary channel included in the network configuration information and may set a communication channel of the second wireless communication unit 120 to correspond to identification information about a secondary channel included in the network configuration information in operation S803.

Subsequently, based on dedicated slot information and a communication ID for each monitor node included in the network configuration information, the manager controller 140 may identify each monitor node 200-N joining in a short-range wireless network and may check a dedicated slot used by each monitor node 200-N in operation S805. Subsequently, the manager controller 140 may broadcast a network joining request message including a short-range wireless network ID by using the first wireless communication unit 110 or by additionally using the second wireless communication unit 120, and at least one of the first wireless communication unit 110 and the second wireless communication unit 120 may establish a wireless link along with each monitor node 200-N to allow a monitor node 200-N to join in the short-range wireless network in operation S807. To provide an additional description, the first wireless communication unit 110 set to a primary channel may preferentially establish a wireless link along with each monitor node 200-N, and the second wireless communication unit 120 set to a secondary channel may establish a wireless link along with each monitor node 200-N which has failed in communication with the primary channel.

Subsequently, at least one of the first wireless communication unit 110 and the second wireless communication unit 120 may receive battery data from a corresponding monitor node 200-N through the established wireless link, and the manager controller 140 may store the received battery data in the non-volatile memory 132 in operation S809. The battery data may be received during a dedicated slot for the corresponding monitor node 200-N.

As described above, when the manager node 100 operates in the second mode, the manager node 100 may quickly establish a short-range wireless network by using network configuration information which is stored in the first mode.

In a case where the wireless battery management system is equipped in a vehicle, the manager node 100 operates in the second mode, and the vehicle is driving, network configuration information may be periodically changed. In this case, in a case where network configuration information stored in the non-volatile memory 132 is updated whenever network configuration information is changed, a read/write operation may be repeated, and due to this, a lifetime of the non-volatile memory 132 may be shortened. Accordingly, only when a specific condition is satisfied, the manager node 100 according to the present disclosure may reflect changed network configuration information in the non-volatile memory 132 to minimize the number of data writing operations performed on the non-volatile memory 132.

Figure 9:
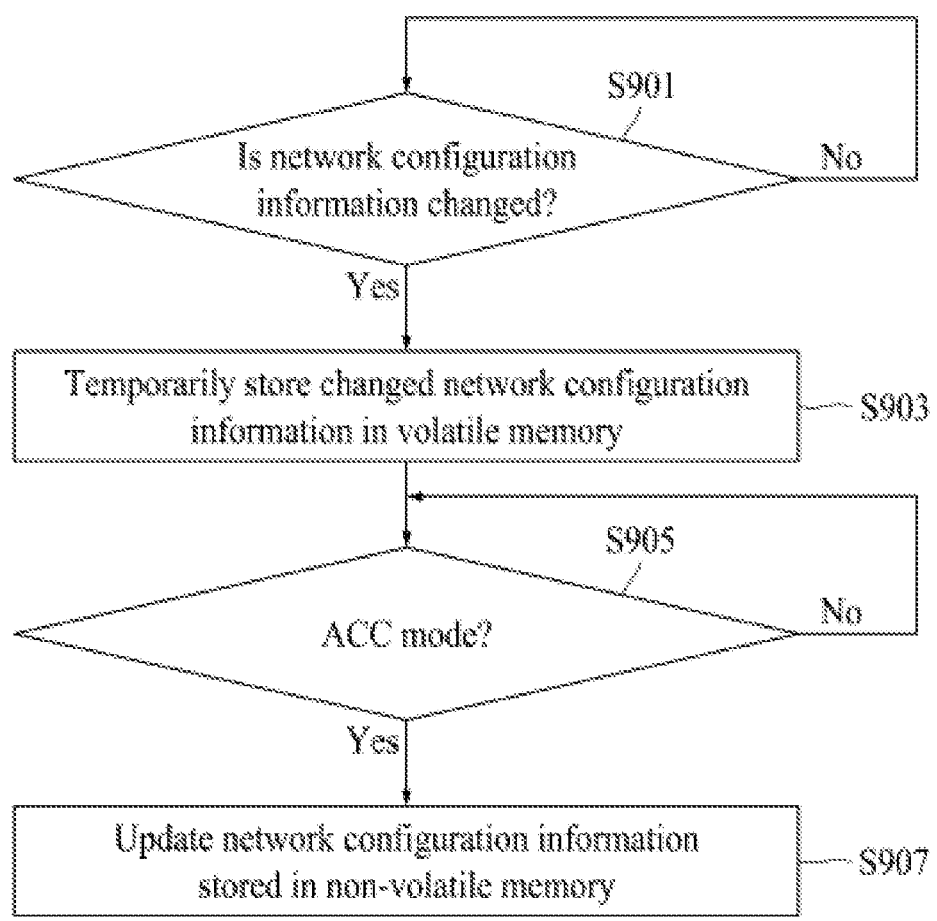
FIG. 9 is a flowchart describing a method of updating network configuration information by using a manager node, according to an embodiment of the present disclosure.

FIG. 9 is a flowchart describing a method of updating network configuration information by using a manager node, according to an embodiment of the present disclosure.

Referring to FIG. 9, in operation S901, the manager controller 140 may monitor whether network configuration information is changed. When a primary channel is changed, the network configuration information may be changed. For example, when the quality of a primary channel which is currently used is degraded while the manager controller 140 is operating in the second mode, the manager controller 140 may determine a primary channel and a secondary channel which are to be changed based on channel scan and evaluation, and may transmit identification information about the primary channel and the secondary channel which are to be changed to each monitor node 200-N. Also, the manager controller 140 may change the primary channel and the secondary channel at a predetermined timing and may change the identification information about the primary channel and the identification information about the secondary channel in the network configuration information, thereby changing the network configuration information. Also, the network configuration information may be changed even when a new monitor node joins in a network or a previous monitor node withdraws from the network.

When the network configuration information is changed, the manager controller 140 may not immediately store changed network configuration information in the non-volatile memory 132 and may temporarily store the changed network configuration information in the volatile memory 131 in operation S903.

Subsequently, in operation S905, the manager controller 140 may check whether a mode of the vehicle is an accessory (ACC) mode. The manager controller 140 may communicate with an electronic control unit (ECC) of the vehicle to check whether the mode of the vehicle is the ACC mode.

When the mode of the vehicle is not the ACC mode, the manager controller 140 may not store the changed network configuration information in the non-volatile memory 132. When the network configuration information is again changed in a state where the mode of the vehicle is not the ACC mode, the manager controller 140 may store latest-changed network configuration information in the volatile memory 131.

When an operation mode of the vehicle is the ACC mode, the manager controller 140 may store the changed network configuration information in the non-volatile memory 132 to update previous network configuration information in operation S907.

Figure 10:
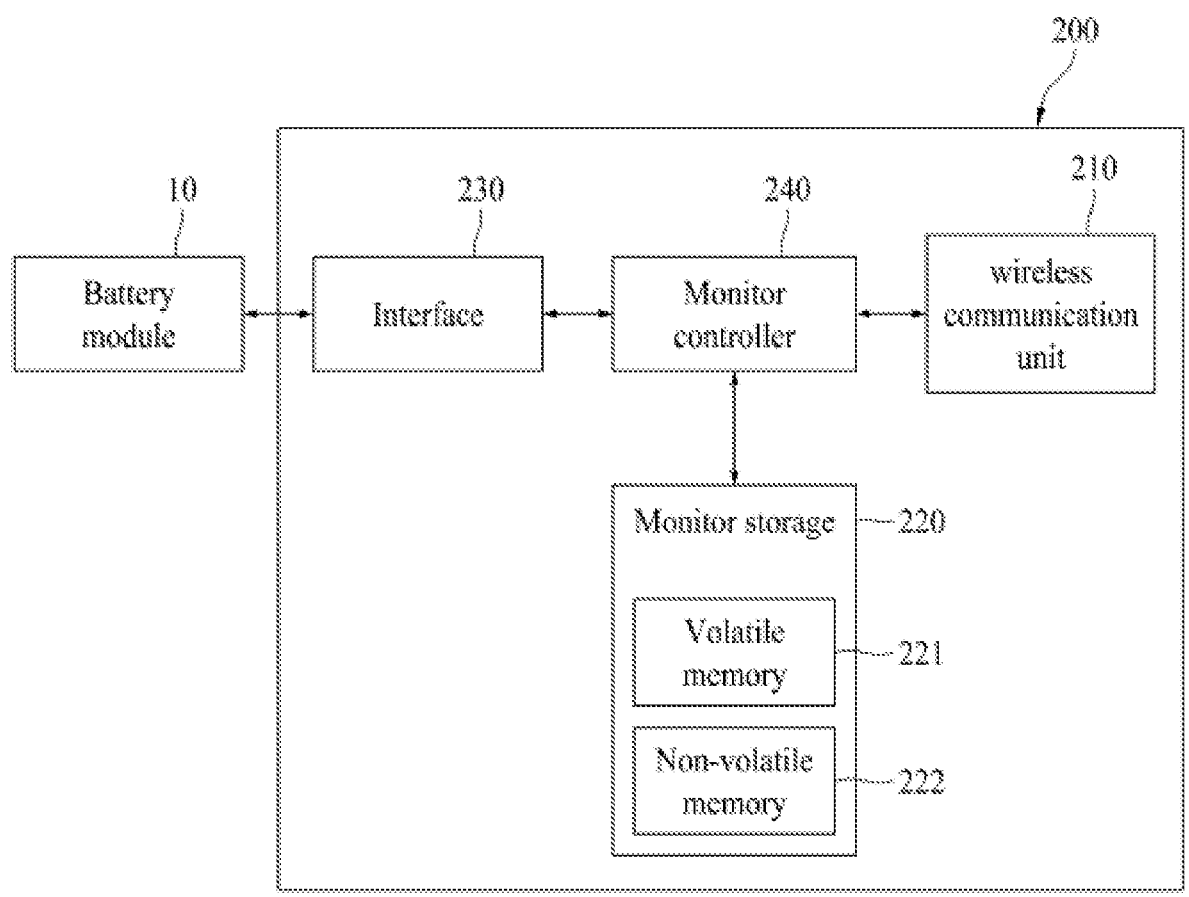
FIG. 10 is a diagram illustrating a configuration of a monitor node according to an embodiment of the present disclosure.

FIG. 10 is a diagram illustrating a configuration of a monitor node 200 according to an embodiment of the present disclosure.

As illustrated in FIG. 10, the monitor node 200 according to an embodiment of the present disclosure may include a wireless communication unit 210, a monitor storage 220, an interface 230, and a monitor controller 240.

The wireless communication unit 210 may perform short-range wireless communication with a manager node 100. The wireless communication unit 210 may receive data from the manager node 100 during a manager slot and may transmit battery data to the manager node 100 during the dedicated slot for the monitor node 200.

The monitor storage 220 may be a storage means such as a disk device or a memory and may store various programs and data for operating the monitor node 200. Particularly, the monitor storage 220 may store a program (or an instruction set) for executing an operation of the monitor node 200 described above.

The monitor storage 220 may include a volatile memory 221 and a non-volatile memory 222. The non-volatile memory 222 may be flash memory or the like and may store the program (or the instruction set) and joining information. The joining information may include a communication ID, dedicated slot information, identification information about a primary channel, and identification information about a secondary channel. Also, the non-volatile memory 222 may store default information. The default information may include identification information about a default primary channel, identification information about a default secondary channel, and identification information about a temporary channel, which are set to default in the first mode. The volatile memory 221 may be RAM and may load data needed for processing by a processor or may store temporary data. The volatile memory 221 may temporarily store changed joining information.

The interface 230 may be an element which supports a communication connection to the battery module 10 equipped with the monitor node 200 and may use a bus wire or a cable or may use control area network (CAN) communication. The monitor node 200 may obtain, through the interface 230, battery data generated in the battery module 10.

The monitor controller 240, as an operation processing device such as a microprocessor, may control an overall operation of the monitor node 200. The monitor controller 240 may move data associated with the program (or the instruction set) stored in the volatile memory 221 to the non-volatile memory 222 and may transmit a joining response message according to an embodiment of the present disclosure to the manager node 100 and may set a dedicated slot and a communication ID.

The monitor controller 240 may obtain various data such as a temperature, a current, humidity, and a voltage of a battery module 10 through the interface 230 and may perform a diagnostic test such as the analog-front-end (AFE) measurement and state test (i.e., a diagnostic test) of the battery module 10. Also, the monitor controller 240 may set a dedicated slot and a communication ID of the monitor node 200 on the basis of assignment information received from the manager node 100. The monitor controller 240 may control the wireless communication unit 210 to transmit battery data, including one or more of a voltage, a current, humidity, a temperature, and diagnostic test data, to the manager node 100 during the set dedicated slot.

The monitor controller 240 may set a communication channel of the wireless communication unit 210 to a primary channel, and when it is unable to perform communication using the primary channel, the monitor controller 240 may change the communication channel of the wireless communication unit 210 to a secondary channel and may communicate with the manager node 100 by using the secondary channel. The monitor controller 240 may perform different processes on the basis of the first mode or the second mode. That is, when the monitor node 200 operates in the first mode, the monitor controller 240 may exchange data with the manager node 100 to generate joining information and may store the joining information in the non-volatile memory 222. Also, when the monitor node 200 operates in the second mode, the monitor controller 240 may quickly join in a short-range wireless network established by the manager node 100 by using the joining information.

Figure 11:
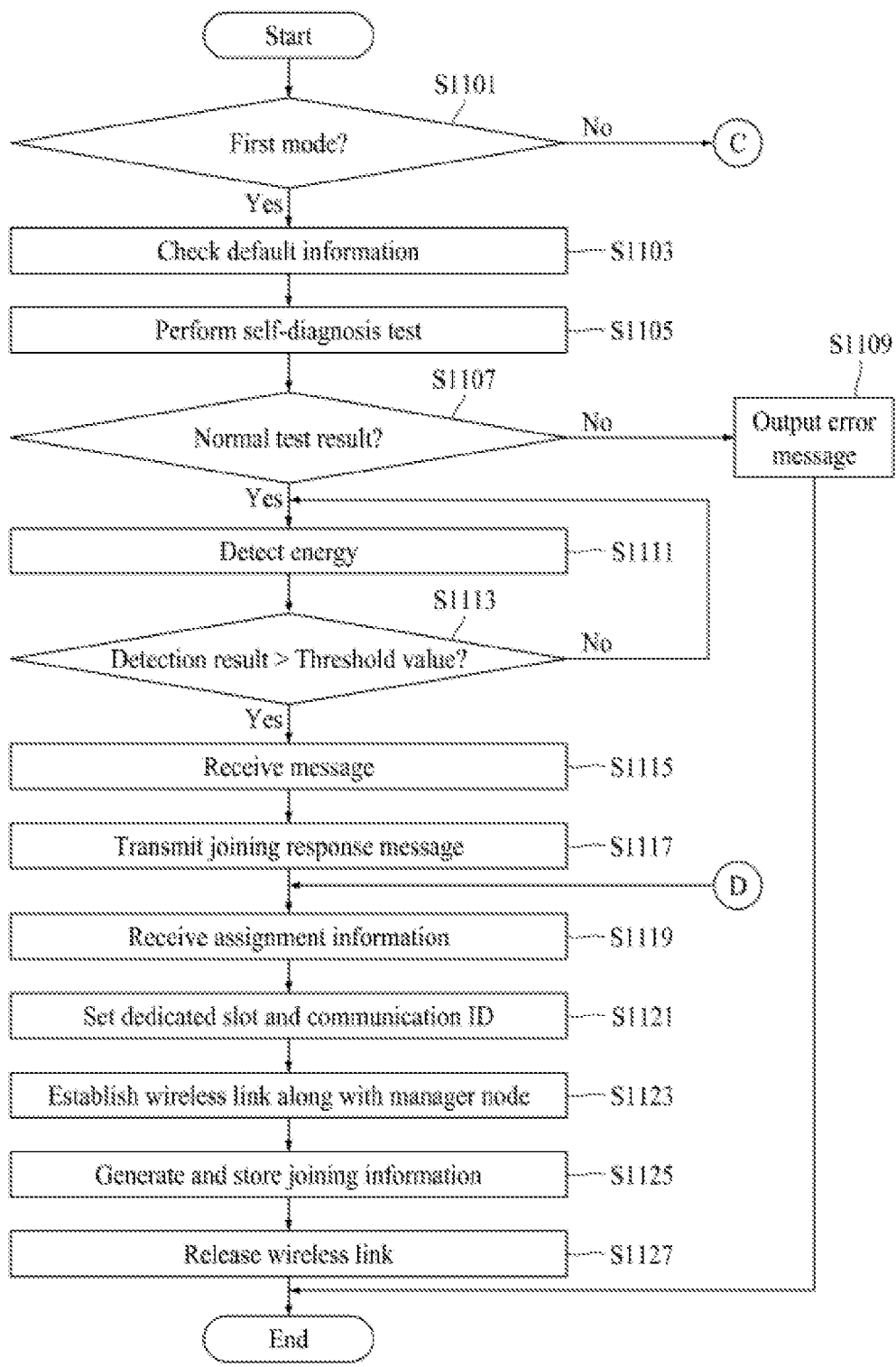
FIG. 11 is a flowchart describing a method of generating and storing joining information by using a monitor node operating in the first mode, according to an embodiment of the present disclosure.

FIG. 11 is a flowchart describing a method of generating and storing joining information by using a monitor node operating in the first mode, according to an embodiment of the present disclosure.

Referring to FIG. 11, when the monitor node 200 is powered on to operate, the monitor controller 240 may determine whether a mode of the monitor node 200 is the first mode or the second mode in operation S1101. When the mode of the monitor node 200 is the second mode, the monitor controller 240 may perform a process illustrated in FIG. 13.

On the other hand, when the monitor node 200 operates in the first mode, the monitor controller 240 may check default information in the non-volatile memory 222 in operation S1103. When joining information is not stored in the non-volatile memory 222 or an operation based on the first mode is input from a user, the monitor controller 240 may determine that the monitor node 200 operates in the first mode.

The monitor controller 240 may perform a self-diagnosis test on hardware of the monitor node 200 in operation S1105. The monitor controller 240 may perform a test on each of an RF chip included in each of the wireless communication unit 210 and an input/output (I/O) port, the volatile memory 221, and the non-volatile memory 222 included in the monitor storage 220. In this case, the monitor controller 240 may apply a predetermined test pattern signal to the RF chip, a memory, and the external I/O port and may compare a stored normal signal with a signal responding thereto to perform a self-diagnosis test. When at least one of the self-diagnosis test results are not normal in operation S1107 (No), the monitor controller 240 may output an error message including a self-diagnosis result to notify an operator that a defect occurs in the monitor node 200 in operation S1109.

On the other hand, when all results of the self-diagnosis test are normal in operation S1107 (Yes), the monitor controller 240 may check identification information about a default primary channel and identification information about a default secondary channel which are set to default in default information and based on the checked identification information, the monitor controller 240 may set a communication channel of the wireless communication unit 210 to the default primary channel. Also, the monitor controller 240 may perform energy detection by using the wireless communication unit 210 to check an energy level of a frequency used in the default primary channel in operation S1111.

Subsequently, the monitor controller 240 may determine whether an energy level of a frequency which is a result value of the energy detection is greater than a predetermined threshold value in operation S1113, and when the energy level of the frequency is not greater than the predetermined threshold value, the monitor controller 240 may determine that manager node 100 does not operate, and after a certain time elapses, may repeatedly perform the energy detection.

On the other hand, when the energy level of the frequency is greater than the predetermined threshold value, the monitor controller 240 may determine that the manager node 100 operates and may wait for receiving a joining request message. When the wireless communication unit 210 receives the joining request message from the manager node 100 in operation S1115, the monitor controller 240 may check a short-range wireless network ID in the joining request message and may transmit a joining response message to the manager node 100 by using the wireless communication unit 210 in operation S1117.

Subsequently, when the wireless communication unit 210 receives assignment information from the manager node 100 in operation S1119, the monitor controller 240 may check a communication ID and dedicated slot information in the assignment information, set the communication ID to an ID of the monitor node 200, and set a period corresponding to the dedicated slot information of a total period for a transmission slot to its own dedicated slot in operation S1121. When the dedicated slot information includes a start point and an end point, the monitor controller 240 may set a period corresponding to the start point and the end point of the total period for the transmission slot to a dedicated slot of the monitor node 200. In another embodiment, when the dedicated slot information includes the number of divisions of the transmission slot and assignment position, the monitor controller 240 may equally divide the transmission slot into periods equal to the number of divisions, and then, may set a period corresponding to the assignment position among the divided periods, to a dedicated slot of the monitor node 200.

Subsequently, the monitor controller 240 may establish a wireless link along with the manager node 100 by using the wireless communication unit 210, and thus, may join in a short-range wireless network formed by the manager node 100 in operation S1123. The monitor controller 240 may check identification information about a primary channel and identification information about a secondary channel, which have been used to join in the short-range wireless network, generate joining information including the communication ID, dedicated slot information, the identification information about the primary channel, the identification information about the secondary channel, and an ID of the short-range wireless network, and store the joining information in the non-volatile memory 222 in operation S1125. Subsequently, in operation S1127, the monitor controller 240 may control the wireless communication unit 210 to release the wireless link between the manager node 100 and the monitor node 200, and thus, may end an operation based on the first mode.

When the primary channel set to default is abnormal, the monitor node 200 may receive identification information about a primary channel, which is to be changed, from the manager node 100.

Figure 12:
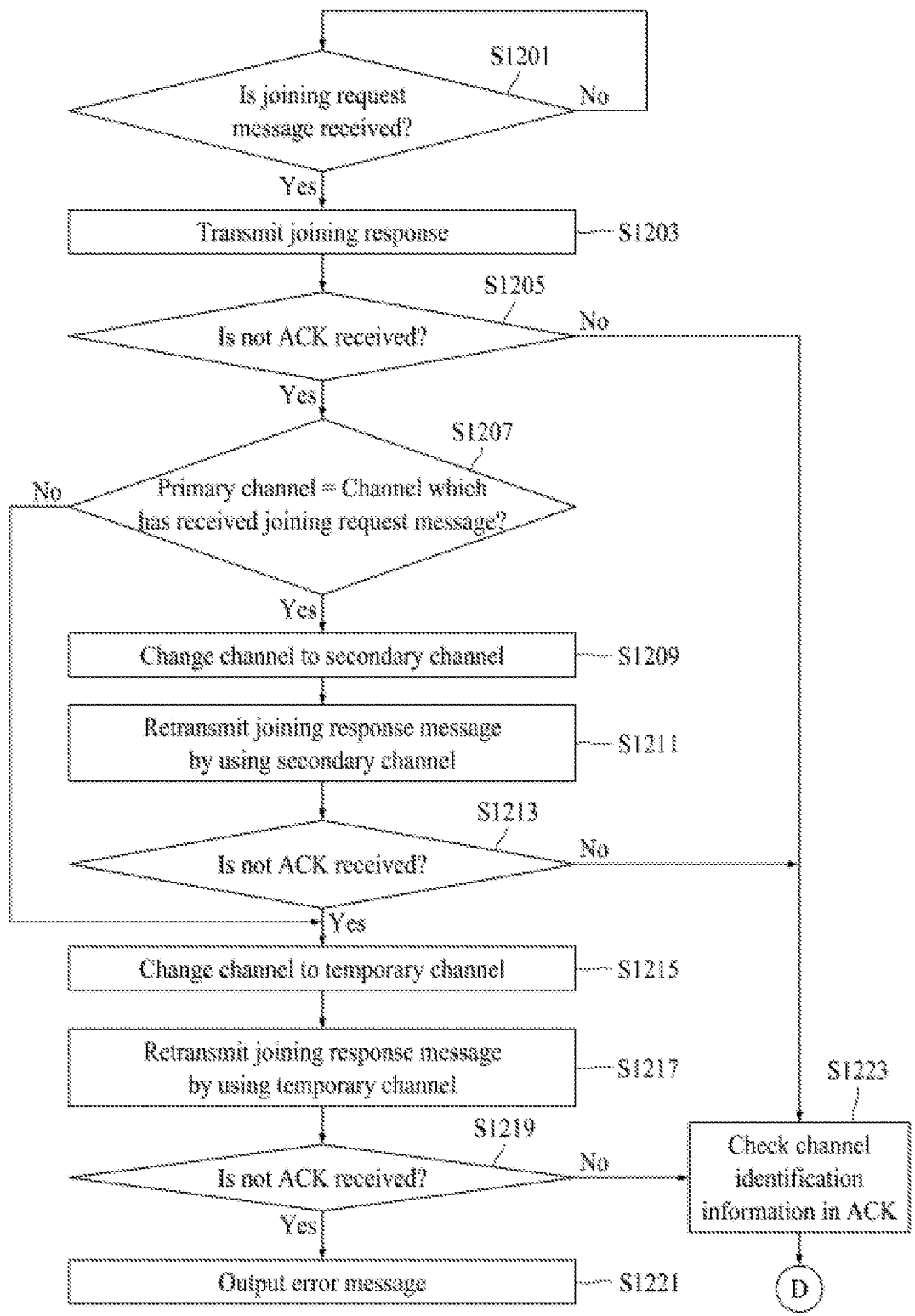
FIG. 12 is a flowchart describing a method of receiving, by a monitor node, identification information about a primary channel which is to be changed, according to an embodiment of the present disclosure.

FIG. 12 is a flowchart describing a method of receiving, by a monitor node, identification information about a primary channel which is to be changed, according to an embodiment of the present disclosure.

Referring to FIG. 12, in operation S1201, the monitor controller 240 may monitor whether the wireless communication unit 210 set to the default primary channel or the default secondary channel receives a joining request message. The monitor controller 240 may set a communication channel of the wireless communication unit 210 to the default primary channel or the default secondary channel on the basis of identification information about the default primary channel and identification information about the default secondary channel included in default information. The monitor controller 240 may first set the communication channel of the wireless communication unit 210 to the default primary channel and may monitor whether the wireless communication unit 210 set to the default primary channel receives the joining request message. When the wireless communication unit 210 set to the default primary channel does not receive the joining request message within a predetermined first threshold time, the monitor controller 240 may change the communication channel of the wireless communication unit 210 to the default secondary channel and may monitor whether the wireless communication unit 210 set to the default secondary channel receives the joining request message within a predetermined second threshold time. When the joining request message is not received through the default secondary channel within the second threshold time, the monitor controller 240 may change again the communication channel of the wireless communication unit 210 to the default primary channel, or may output an error message notifying that it is impossible to communicate with the manager node 100.

Subsequently, when the wireless communication unit 210 set to the default primary channel or the default secondary channel receives the joining request message from the manager node 100, the monitor controller 240 may transmit a joining response message including identification information about the monitor node 200 to the manager node 100 by using the wireless communication unit 210 in operation S1203. Subsequently, in operation S1205, the monitor controller 240 may monitor whether the wireless communication unit 210 receives the ACK within a predetermined third threshold time. When the wireless communication unit 210 does not receive the ACK within the predetermined third threshold time, the monitor controller 240 may check whether a communication channel receiving the joining request message is the default primary channel or the default secondary channel in operation S1207. That is, the monitor controller 240 may check whether the communication channel of the wireless communication unit 210 which is currently set is the default primary channel or the default secondary channel. Subsequently, when the channel receiving the joining request message is the default primary channel, the monitor controller 240 may change the communication channel of the wireless communication unit 210 to the default secondary channel in operation S1209. Also, in operation S1211, the monitor controller 240 may retransmit the joining response message by using the wireless communication unit 210 changed to the default secondary channel.

Subsequently, in operation S1213, the monitor controller 240 may monitor whether the wireless communication unit 210 set to the default secondary channel receives the ACK within a predetermined fourth threshold time. When the wireless communication unit 210 does not receive the ACK within the predetermined fourth threshold time, the monitor controller 240 may change the communication channel of the wireless communication unit 210 from the default primary channel to a temporary channel in operation S1215. Also, in operation S1217, the monitor controller 240 may retransmit the joining response message by using the wireless communication unit 210 changed to the temporary channel.

In operation S1219, the monitor controller 240 may monitor whether the wireless communication unit 210 set to the temporary channel receives the ACK within a predetermined fifth threshold time. When the wireless communication unit 210 does not receive the ACK within the predetermined fifth threshold time, the monitor controller 240 may output an error message notifying that it is impossible to communicate with the manager node 100, and thus, may request a check of the wireless battery management system from an operator in operation S1221.

When the channel which has received the joining request message in operation S1207 is the default secondary channel, the monitor controller 240 may perform operation S1215 of changing the communication channel of the wireless communication unit 210 from the default secondary channel to the temporary channel.

When the wireless communication unit 210 receives the ACK in operation S1205, S1213, or S1219, the monitor controller 240 may check whether the identification information about the primary channel and the identification information about the secondary channel are included in the ACK, and thus, may check the identification information about the primary channel and the identification information about the secondary channel in the ACK in operation S1223. The identification information about the primary channel and the identification information about the secondary channel may each be identification information about a channel to be used in the second mode, and when the ACK is received through the default secondary channel or the temporary channel, the identification information about the primary channel and the identification information about the secondary channel may be included in the ACK. Subsequently, when the identification information about the primary channel and the identification information about the secondary channel are included in the ACK, the monitor controller 240 may change the communication channel of the wireless communication unit 210 to a primary channel corresponding to the primary channel identification information, and then, by performing operations from operation S1119 of FIG. 11, the monitor controller 240 may set a communication ID and a dedicated slot of the monitor node 200 on the basis of assignment information received from the manager node 100 and may establish a short-range wireless link along with the manager node 100.

Figure 13:
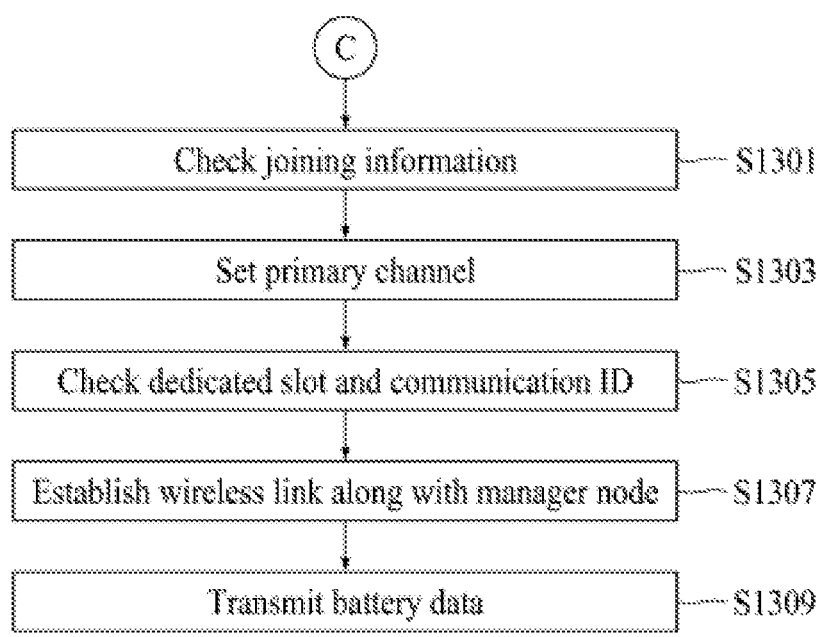
FIG. 13 is a flowchart describing a method of joining in a network by using a monitor node operating in the second mode, according to an embodiment of the present disclosure.

FIG. 13 is a flowchart describing a method of joining in a network by using a monitor node operating in the second mode, according to an embodiment of the present disclosure.

Referring to FIG. 13, when the monitor controller 240 operates in the second mode, the monitor controller 240 may check joining information in the non-volatile memory 222 in operation S1301. Subsequently, the monitor controller 240 may set a communication channel of the wireless communication unit 210 to correspond to identification information about a primary channel included in the joining information.

Subsequently, the monitor controller 240 may check a communication ID and dedicated slot information included in the joining information, set the communication ID to an ID of the monitor node 200, and set a period corresponding to the dedicated slot information in a transmission slot of a data frame to a dedicated slot for the monitor node 200 in operation S1305.

Subsequently, when the wireless communication unit 210 receives a joining request message transmitted from the manager node 100, the monitor controller 240 may check that a short-range wireless network ID included in the joining request message matches a short-range wireless network ID included in the joining information. Also, the monitor controller 240 may establish a short-range wireless link between the manager node 100 and the monitor node 200 by using the wireless communication unit 210, and thus, may join in a short-range wireless network in operation S1307.

Subsequently, the monitor controller 240 may collect, through the interface 230, battery data including one or more of a voltage, a current, humidity, a temperature, and diagnostic test data which occur in the battery module 10. Also, in operation S1309, the monitor controller 240 may control the wireless communication unit 210 so that the collected battery data is transmitted to the manager node 100 during a dedicated slot for the monitor node 200.

When the monitor controller 240 fails in transmitting the battery data through the wireless communication unit 210 set to a primary channel, the monitor controller 240 may change the communication channel of the wireless communication unit 210 to a secondary channel to correspond to secondary channel identification information included in the joining information and may transmit the battery data through the secondary channel.

In a case where the wireless battery management system is equipped in a vehicle, the monitor node 200 operates in the second mode, and the vehicle is driving, the joining information may be periodically changed. In this case, in a case where the joining information stored in the non-volatile memory 222 is updated whenever the joining information is changed, a read/write operation may be repeated, and due to this, a lifetime of the non-volatile memory 222 may be shortened. Accordingly, only when a specific condition is satisfied, the monitor node 200 according to the present disclosure may reflect the changed joining information in the non-volatile memory 222 to minimize the number of data writing operations performed on the non-volatile memory 222.

Figure 14:
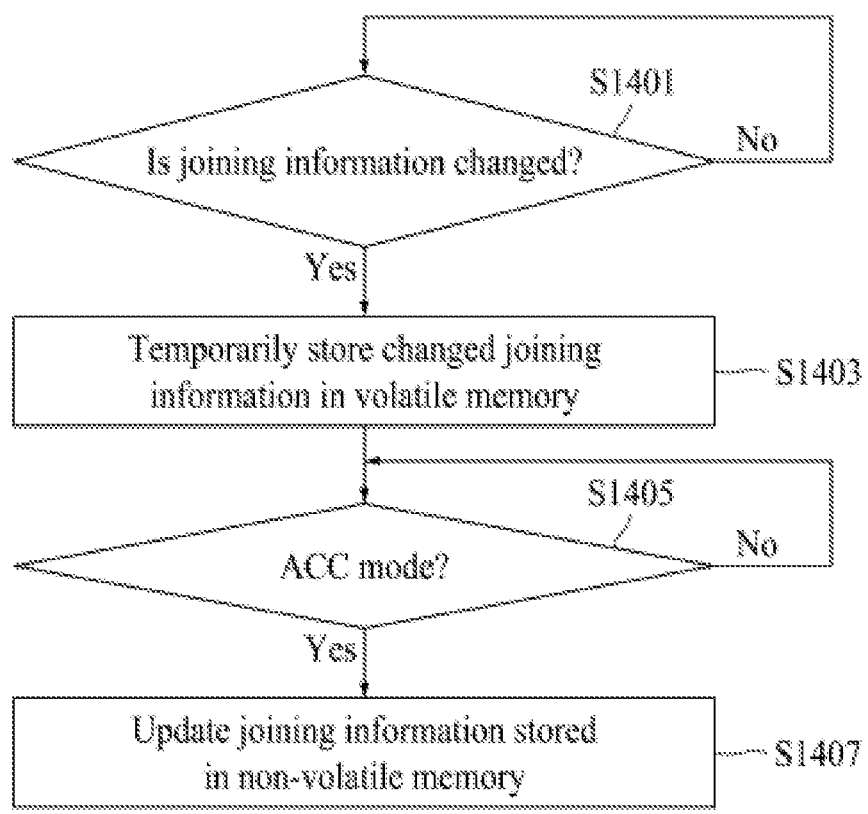
FIG. 14 is a flowchart describing a method of updating joining information by using a monitor node, according to an embodiment of the present disclosure.

FIG. 14 is a flowchart describing a method of updating joining information by using a monitor node, according to an embodiment of the present disclosure.

Referring to FIG. 14, in operation S1401, the monitor controller 240 may monitor whether joining information is changed. When a primary channel or a secondary channel is changed or a dedicated slot is changed, the joining information may be changed. For example, when the quality of a primary channel which is being currently used in the second mode is degraded to cause the manager node 100 to change a primary channel and a secondary channel, the wireless communication unit 210 may receive, from the manager node 100, identification information about a primary channel which is to be changed and identification information about a secondary channel which is to be changed, and the monitor controller 240 may check that the joining information is changed because the received identification information about the primary channel and identification information about the secondary channel differ from channel identification information stored in the non-volatile memory 222. As another example, when the manager node 100 adjusts dedicated slot because a new monitor node 200-N joins in a short-range wireless network or a previous monitor node 200-N withdraws from the short-range wireless network, the wireless communication unit 210 may receive the adjusted dedicated slot information, and the monitor controller 240 may check that the joining information is changed because the received dedicated slot information differs from dedicated slot information stored in the non-volatile memory 222.

When the joining information is changed, the monitor controller 240 may not immediately store changed joining information in the non-volatile memory 222 and may temporarily store the changed joining information in the volatile memory 221 in operation S1403.

Subsequently, in operation S1405, the monitor controller 240 may check whether a mode of the vehicle is the ACC mode. When the mode of the vehicle is not the ACC mode, the monitor controller 240 may not store the changed joining information in the non-volatile memory 222. When the joining information is again changed in a state where the mode of the vehicle is not the ACC mode, the monitor controller 240 may temporarily store latest-changed joining information in the volatile memory 221.

When an operation mode of the vehicle is the ACC mode, the monitor controller 240 may store the changed joining information in the non-volatile memory 222 to update previous joining information in operation S1407.

According to the embodiments of the present disclosure, network configuration information may be previously stored when the first mode is performed, and when the second mode is performed, a short-range wireless network between a manager node and a monitor node may be quickly established by using the stored network configuration information.

Moreover, according to the embodiments of the present disclosure, an optimal channel may be searched for in the first mode, and in a state where the manager node and the monitor node share information about the searched optimal channel, when the second mode is performed, a wireless link between the manager node and the monitor node may be quickly established based on the information about the searched optimal channel.

Furthermore, according to the embodiments of the present disclosure, even when the network configuration information is changed, the changed network configuration information may not immediately be stored in a non-volatile memory (for example, flash memory), and the changed network configuration information is updated in the non-volatile memory when a mode of a vehicle is ACC mode, thereby minimizing the number of write/read operations of the non-volatile memory to increase a lifetime of the non-volatile memory.

Moreover, according to the embodiments of the present disclosure, the manager node may establish a plurality of communication channels, and when an error occurs in a first communication channel of the plurality of communication channels, the manager node may continuously communicate with the monitor node by using a second communication channel of the plurality of communication channels.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

All of the disclosed methods and procedures described in this disclosure can be implemented, at least in part, using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors or other hardware components which, when executing the series of computer instructions, perform or facilitate the performance of all or part of the disclosed methods and procedures.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A wireless battery management system comprising:
   a manager node storing network configuration information when operating in a first mode, and when operating in a second mode, checking one or more monitor nodes being joined in a short-range wireless network using the network configuration information to establish the short-range wireless network along with each of the checked one or more monitor nodes; and
   one or more monitor nodes storing joining information for joining in the short-range wireless network when operating in the first mode, and when operating in the second mode, joining in the short-range wireless network on the basis of the joining information to transmit battery data to the manager node,
   wherein the network configuration information includes dedicated slot information about each monitor node joining in the short-range wireless network and identification information about a channel which is used to form the short-range wireless network.

2. The wireless battery management system of claim 1, wherein the identification information includes identification information about a primary channel and identification information about a secondary channel,
   when the manager node operates in the first mode, the manager node stores the network configuration information, and
   when the monitor nodes operate in the first mode, the monitor nodes store the joining information including the identification information about the primary channel, the identification information about the secondary channel, and the dedicated slot information.

3. The wireless battery management system of claim 2, wherein
   a data frame comprises a manager slot assigned for the manager node and a transmission slot assigned for the monitor nodes, and
   the monitor nodes set a period corresponding to the dedicated slot information included in the joining information in the transmission slot as a dedicated slot for a corresponding monitor node and transmit the battery data to the manager node during the set dedicated slot.

4. The wireless battery management system of claim 2, wherein
   the manager node sets a primary channel and a secondary channel on the basis of the identification information about each of the primary channel and the secondary channel included in the network configuration information and establishes the short-range wireless network along with each monitor node by using at least one of the primary channel and the secondary channel, and
   the monitor nodes transmit the battery data to the manager node through the primary channel, and when the transmission of the battery data through the primary channel fails, the monitor nodes retransmit the battery data to the manager node through the secondary channel.

5. The wireless battery management system of claim 2, wherein,
   when the manager node operates in the first mode, the manager node assigns a dedicated slot for each monitor node joining in the short-range wireless network to add dedicated slot information about each monitor node to the network configuration information, and when the manager node operates in the second mode, the manager node identifies the dedicated slot assigned for each monitor node on the basis of the dedicated slot information about each monitor node included in the network configuration information, and
   the monitor nodes receive the dedicated slot information from the manager node and add the dedicated slot information in the joining information.

6. A manager node comprising:
   a first wireless communication unit configured to communicate using a primary channel;
   a second wireless communication unit configured to communicate using a secondary channel;
   a manager storage storing network configuration information; and
   a manager controller configured to store the network configuration information in the manager storage when operating in a first mode, and when operating in a second mode, to check each monitor node to be joined in a short-range wireless network using the network configuration information and to establish the short-range wireless network for receiving battery data along with each checked monitor node by using at least one of the first wireless communication unit and the second wireless communication unit,
   wherein the network configuration information includes dedicated slot information about each monitor node joining in the short-range wireless network and identification information about each of the primary channel and the secondary channel which are used to form the short-range wireless network.

7. The manager node of claim 6, wherein the manager controller sets a communication channel for the first wireless communication unit as the primary channel, sets a communication channel for the second wireless communication unit as the secondary channel, based on the identification information about each of the primary channel and the secondary channel, and the manager controller identifies a dedicated slot for each monitor node in a data frame based on the dedicated slot information about each monitor node.

8. The manager node of claim 6, wherein, when the manager node operates in the first mode, the manager controller broadcasts a joining request message by using at least one of the primary channel and the secondary channel, assigns the dedicated slot for each monitor node which has responded to the joining request message, generates the network configuration information, and stores the generated network configuration information in the manager storage.

9. The manager node of claim 8, wherein,
when the manager node operates in the first mode,
the manager controller broadcasts the joining request message by using the primary channel, and
when a response to the joining request message is not received from a monitor node, the manager controller broadcasts the joining request message by using the secondary channel, changes the communication channel for the first wireless communication unit from the primary channel to a predetermined temporary channel, and receives the response to the joining request message through the secondary channel or the temporary channel.

10. The manager node of claim 9, wherein the manager controller selects a primary channel to be changed, transmits identification information about the selected primary channel to each monitor node through the secondary channel or the temporary channel, changes the communication channel for the first wireless communication unit from the temporary channel to the selected primary channel, establishes the short-range wireless network along with each monitor node by using the changed primary channel, and adds identification information about the changed primary channel to the network configuration information as identification information about the primary channel.

11. The manager node of claim 10, wherein the manager controller performs a channel scan by using the first wireless communication unit or the second wireless communication unit to select a channel, where a preamble is not detected and an energy level of a frequency is lowest, of scanned channels as the primary channel to be changed.

12. The manager node of claim 6, wherein
the manager node is equipped in a vehicle, and
when the network configuration information is changed and a mode of the vehicle is an accessory (ACC) mode, the manager controller stores the changed network configuration information in a non-volatile memory of the manager storage to update the network configuration information.

13. A monitor node comprising:
a wireless communication unit configured to perform wireless communication with a manager node;
a monitor storage storing joining information; and
a monitor controller configured to store the joining information in the monitor storage when operating in a first mode, when operating in a second mode, to set a dedicated slot in a data frame on the basis of dedicated slot information included in the joining information, to establish a short-range wireless network along with the manager node by setting a communication channel for the wireless communication unit on the basis of channel identification information included in the joining information, and to transmit battery data to the manager node during the set dedicated slot.

14. The monitor node of claim 13, wherein,
when the monitor node operates in the first mode, the wireless communication unit receives the dedicated slot information from the manager node, and
the monitor controller generates the joining information including the dedicated slot information and identification information about a primary channel which has been used to establish the short-range wireless network along with the manager node and stores the generated joining information in the monitor storage.

15. The monitor node of claim 14, wherein, when the monitor node operates in the first mode, the monitor controller sets the communication channel for the wireless communication unit as a default primary channel, establishes the short-range wireless network along with the manager node by using the default primary channel, and adds identification information about the default primary channel in the joining information as the identification information about the primary channel.

16. The monitor node of claim 15, wherein,
when the establishing of the short-range wireless network based on the default primary channel fails, the wireless communication unit changes the communication channel to a default secondary channel or a temporary channel and receives identification information about a primary channel to be changed from the manager node through the default secondary channel or the temporary channel, and
the monitor controller changes the communication channel for the wireless communication unit on the basis of the received identification information about the primary channel to be changed, and adds the received identification information about the primary channel in the joining information when the short-range wireless network is established between the manager node and the monitor node on the basis of the changed communication channel.

17. The monitor node of claim 13, wherein, when operating in the second mode, the monitor controller sets the communication channel for the wireless communication unit to a primary channel based on identification information about the primary channel included in the joining information to transmit the battery data to the manager node through the primary channel, and when the transmission of the battery data through the primary channel fails, the monitor controller changes the communication channel for the wireless communication unit to a secondary channel to transmit the battery data through the secondary channel.

18. The monitor node of claim 13, wherein the monitor node is equipped in a vehicle, and when the joining information is changed and a mode of the vehicle is an accessory (ACC) mode, the monitor controller stores the changed joining information in a non-volatile memory of the monitor storage to update the joining information.

* * * * *